US012389149B2

(12) United States Patent
Kim et al.

(10) Patent No.: US 12,389,149 B2
(45) Date of Patent: *Aug. 12, 2025

(54) APPARATUS FOR OUTPUTTING SOUND

(71) Applicant: LG DISPLAY CO., LTD., Seoul (KR)

(72) Inventors: Taehyung Kim, Gimpo-si (KR); YoungYoon You, Gwangju (KR); GeunChang Park, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 58 days.

This patent is subject to a terminal disclaimer.

(21) Appl. No.: 18/387,725

(22) Filed: Nov. 7, 2023

(65) Prior Publication Data

US 2024/0080597 A1 Mar. 7, 2024

Related U.S. Application Data

(63) Continuation of application No. 17/992,890, filed on Nov. 22, 2022, now Pat. No. 11,856,350, which is a (Continued)

(30) Foreign Application Priority Data

Dec. 29, 2017 (KR) ........................ 10-2017-0184861

(51) Int. Cl.

*H04R 1/02* (2006.01)
*H04R 7/04* (2006.01)
*H04R 17/00* (2006.01)

(52) U.S. Cl.

CPC ............. *H04R 1/028* (2013.01); *H04R 7/045* (2013.01); *H04R 17/00* (2013.01); *H04R 2499/15* (2013.01)

(58) Field of Classification Search

CPC .... H04R 2499/15; H04R 7/045; H04R 1/028; H04R 2499/11; H04R 17/00;
(Continued)

(56) References Cited

U.S. PATENT DOCUMENTS

| | | | |
|---|---|---|---|
| 5,493,541 | A | 2/1996 | Snyder |
| 10,652,641 | B2 | 5/2020 | Kim et al. |

(Continued)

FOREIGN PATENT DOCUMENTS

| | | | |
|---|---|---|---|
| CN | 201718027 | U | 1/2011 |
| CN | 105096778 | A | 11/2015 |

(Continued)

OTHER PUBLICATIONS

Office Action dated Jan. 31, 2024, issued in corresponding Chinese Patent Application No. 202110168715.8. (Note: US 2015/0341714 A1, US 2007/0206822 A1, U.S. Pat. No. 5,493,541 A, US 2004/0133366 A1, were previously cited).

(Continued)

*Primary Examiner* — Kile O Blair

(74) *Attorney, Agent, or Firm* — Morgan, Lewis & Bockius LLP

(57) ABSTRACT

An apparatus for outputting sound includes a vibration plate, a vibration element at a rear surface of the vibration plate, and a vibration reflecting member spaced apart from the vibration element to face a lateral surface of the vibration element. The vibration reflecting member includes a metal material.

40 Claims, 12 Drawing Sheets

Related U.S. Application Data continuation of application No. 17/196,982, filed on Mar. 9, 2021, now Pat. No. 11,533,551, which is a continuation of application No. 16/841,240, filed on Apr. 6, 2020, now Pat. No. 10,979,793, which is a continuation of application No. 16/105,398, filed on Aug. 20, 2018, now Pat. No. 10,652,641.

(58) Field of Classification Search
CPC ............ H04R 2440/00; H04R 2440/05; H04R 2440/07; H04R 17/005; H04R 7/04; H04R 7/26; H04R 2207/00; H04R 2207/021; H04R 2307/201; G06F 1/1688; G06F 1/1605; H04N 5/642
See application file for complete search history.

(56) References Cited

U.S. PATENT DOCUMENTS

| | | | | |
|---|---|---|---|---|
| 10,979,793 | B2 | 4/2021 | Kim et al. | |
| 11,533,551 | B2 | 12/2022 | Kim et al. | |
| 2004/0133366 | A1 | 7/2004 | Sullivan et al. | |
| 2007/0206822 | A1 | 9/2007 | Whitwell et al. | |
| 2012/0162143 | A1 * | 6/2012 | Kai ..................... | H04M 1/0266 345/177 |
| 2013/0064401 | A1 | 3/2013 | Wang et al. | |
| 2013/0099907 | A1 | 4/2013 | Ching et al. | |
| 2015/0341714 | A1 | 11/2015 | Ahn et al. | |
| 2016/0014247 | A1 | 1/2016 | Behles et al. | |
| 2017/0280216 | A1 | 9/2017 | Lee et al. | |
| 2017/0280234 | A1 | 9/2017 | Choi et al. | |
| 2017/0287990 | A1 | 10/2017 | Choi et al. | |
| 2017/0289694 | A1 | 10/2017 | Choi et al. | |
| 2018/0198052 | A1 | 7/2018 | Park | |

FOREIGN PATENT DOCUMENTS

| | | | | |
|---|---|---|---|---|
| CN | 106303851 | A | 1/2017 | |
| CN | 206805054 | U | 12/2017 | |
| EP | 2 587 343 | A1 | 5/2013 | |
| EP | 3 226 069 | A2 | 10/2017 | |
| EP | 3 229 272 | A1 | 10/2017 | |
| EP | 3330780 | A1 * | 6/2018 | ........... G02F 1/1333 |
| JP | 2004-343362 | A | 12/2004 | |
| KR | 10-2005-0114163 | A | 12/2005 | |

OTHER PUBLICATIONS

Office Action dated Aug. 30, 2024 issued in corresponding Chinese Patent Application No. 202110168802.3.
Extended European Search Report dated Oct. 5, 2020, issued in corresponding European Patent Application No. 20192641.7.
Extended European Search Report issued in corresponding European Patent Application No. 23 15 4508, dated Mar. 22, 2023.
Office Action issued in corresponding Korean Patent Application No. 10-2022-0079669, dated Feb. 13, 2023.

* cited by examiner

APPARATUS FOR OUTPUTTING SOUND

CROSS-REFERENCE TO RELATED APPLICATIONS

This application is a continuation of co-pending U.S. patent application Ser. No. 17/992,890, filed on Nov. 22, 2022, which is a continuation of U.S. patent application Ser. No. 17/196,982, filed on Mar. 9, 2021, now U.S. Pat. No. 11,533,551, which is a continuation of U.S. patent application Ser. No. 16/841,240, filed on Apr. 6, 2020, now U.S. Pat. No. 10,979,793, which is a continuation of U.S. patent application Ser. No. 16/105,398, filed on Aug. 20, 2018, now U.S. Pat. No. 10,652,641, which claims the benefit of Korean Patent Application No. 10-2017-0184861, filed on Dec. 29, 2017. The entirety of each of the above prior U.S. and Korean patent applications is hereby incorporated by reference as if fully set forth herein.

BACKGROUND

Technical Field

The present disclosure relates to a display apparatus.

Discussion of the Related Art

Generally, display apparatuses are equipped in home appliances or electronic devices, such as televisions (TVs), monitors, notebook computers, smartphones, tablet computers, electronic organizers, electronic pads, wearable devices, watch phones, portable information devices, navigation devices, and automotive control display apparatuses, and are used as a screen for displaying an image.

General display apparatuses include a display panel for displaying an image and a sound device for outputting a sound associated with the image.

However, in general display apparatuses, because a sound output from a sound device travels to a region behind or under a display panel, sound quality is degraded due to interference between sounds reflected from a wall and the ground, and for this reason, there is a problem that clear transmission of the sound is difficult and a viewer's immersion experience is reduced.

SUMMARY

Accordingly, the present disclosure is to provide a display apparatus that substantially obviates one or more problems due to limitations and disadvantages of the related art.

An object of the present disclosure is to provide a display apparatus which outputs a sound to a region in front of a display panel.

Another object of the present disclosure is to provide a display apparatus for improving a low-pitched sound band characteristic of a sound output based on a vibration of a display panel.

Additional advantages and features of the disclosure will be set forth in the description which follows, and in part will be apparent from the description, or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a display apparatus, comprising a display panel configured to display an image by emitting light; and a sound generation device including a vibration generation module configured to vibrate the display panel, wherein the vibration generation module includes a vibration element on a rear surface of the display panel; and a vibration reflecting member on the rear surface of the display panel and spaced apart from the vibration element.

In another aspect, there is provided a display apparatus, comprising a display panel configured to display an image by emitting light; and a sound generation device including a vibration generation module configured to vibrate the display panel, wherein the vibration generation module includes a vibration element on a rear surface of the display panel; and a weight member on the rear surface of the display panel.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

DETAILED DESCRIPTION OF THE DISCLOSURE

Figure 1:
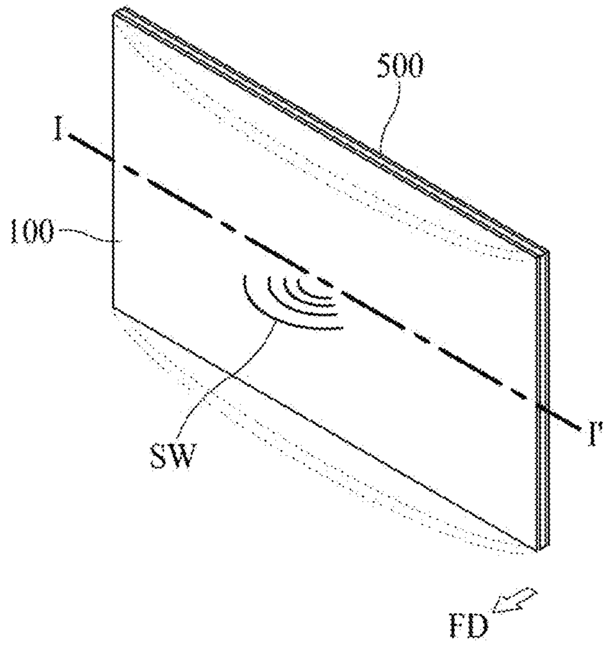
FIG. 1 is a diagram illustrating a display apparatus according to a first embodiment of the present disclosure.

Reference will now be made in detail to the embodiments of the present disclosure, examples of which are illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure may be sufficiently thorough and complete to assist those skilled in the art to fully understand the scope of the present disclosure to those skilled in the art. Further, the present disclosure is only defined by scopes of claims.

A shape, a size, a ratio, an angle, and a number disclosed in the drawings for describing embodiments of the present disclosure are merely an example. Thus, the present disclosure is not limited to the illustrated details. In the following description, when the detailed description of the relevant known function or configuration is determined to unnecessarily obscure an important point of the present disclosure, the detailed description of such known function or configuration may be omitted.

In a case where "comprise," "have," and "include" described in the present specification are used, another part may be added unless a more limiting term, such as "only" is used. The terms of a singular form may include plural forms unless referred to the contrary.

In construing an element, the element is construed as including an error range although there is no explicit description of such an error or tolerance range.

In describing a position relationship, when a position relation between two parts is described as "on," "over," "under," or "next," one or more other parts may be disposed between the two parts unless a more limiting term, such as "just" or "direct(ly)" is used.

In describing a time relationship, when the temporal order is described as "after," "subsequent," "next," or "before," a case which is not continuous may be included unless a more limiting term, such as "just," "immediate(ly)," or "direct (ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms like "first," "second," "A," "B," "(a)," and "(b)" may be used. These terms are merely for differentiating one element from another element, and the essence, sequence, order, or number of a corresponding element should not be limited by the terms. Also, when an element or layer is described as being "connected," "coupled," or "adhered" to another element or layer, the element or layer can not only be directly connected or adhered to that other element or layer, but also be indirectly connected or adhered to the other element or layer with one or more intervening elements or layer "disposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto, unless otherwise specified.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Figure 2:
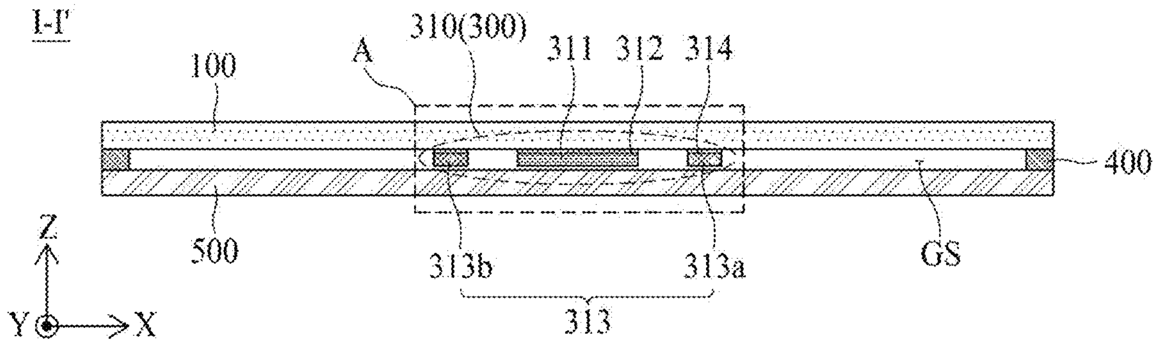
FIG. 2 is a schematic cross-sectional view taken along line I-I" illustrated in FIG. 1.
Figure 3:
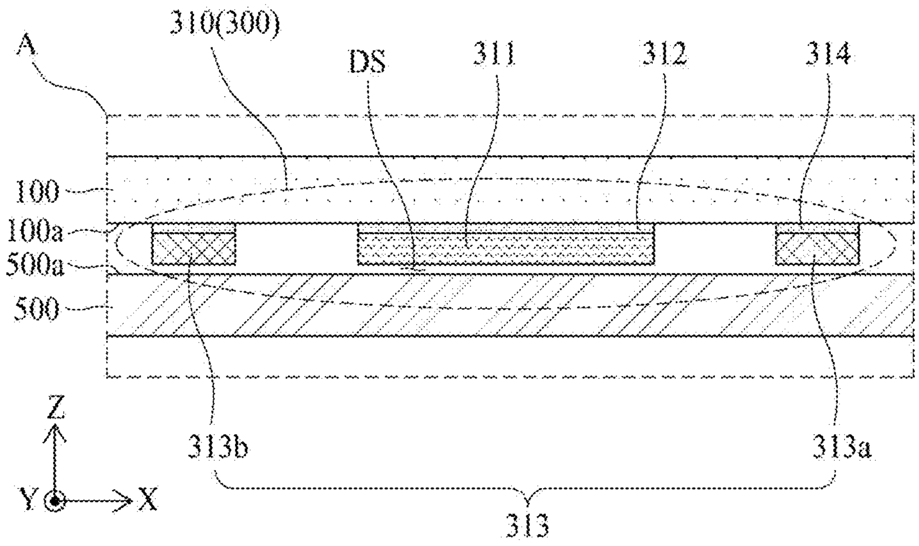
FIG. 3 is an enlarged view of a portion A illustrated in FIG. 2.
Figure 4:
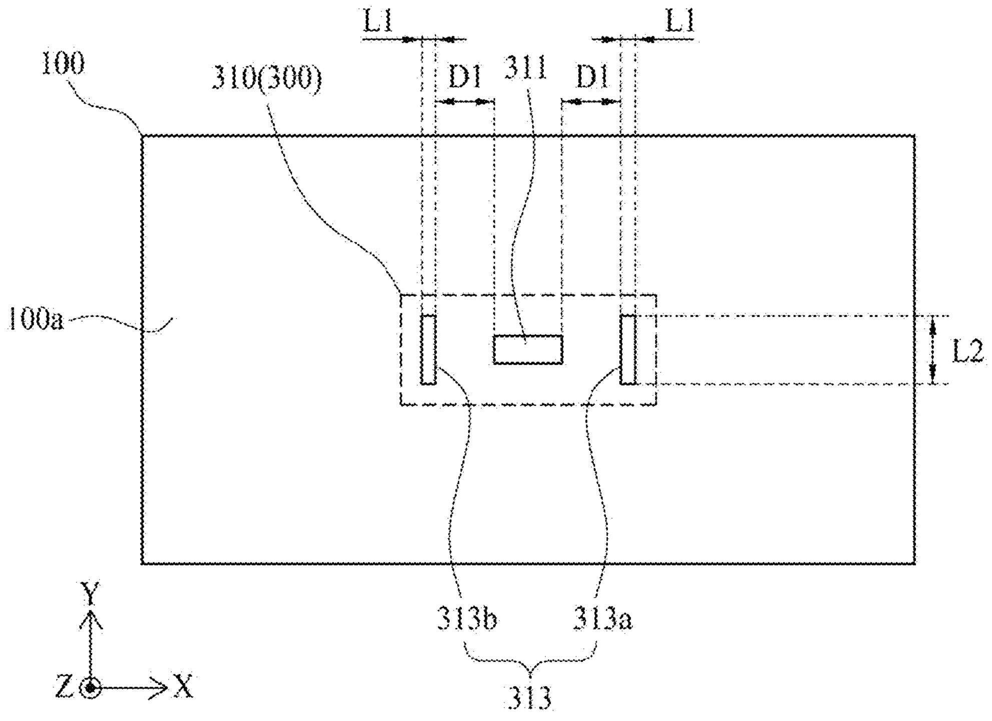
FIG. 4 is a diagram illustrating a sound generation device according to a first embodiment of the present disclosure illustrated in FIGS. 2 and 3.

FIG. 1 is a diagram illustrating a display apparatus according to a first embodiment of the present disclosure. FIG. 2 is a schematic cross-sectional view taken along line I-I' illustrated in FIG. 1. FIG. 3 is an enlarged view of a portion A illustrated in FIG. 2. FIG. 4 is a diagram illustrating a sound generation device according to the first embodiment of the present disclosure illustrated in FIGS. 2 and 3.

With reference to FIGS. 1 to 4, the display apparatus according to a first embodiment of the present disclosure may include a display panel 100 and a sound generation device 300.

The display panel 100 may display an image and may be used as a panel speaker that may be vibrated by the sound generation device 300 disposed on a rear surface of the display panel 100 to output sound. The front surface of the display panel 100 may be defined as the main surface of the display panel 201 configured to display an image. The rear surface of the display panel 100 may be defined as the surface of the display panel 100 opposite to the front surface thereof.

The display panel 100 according to the present disclosure may be a curved display panel or one of any type of display panel, such as a liquid crystal display panel, an organic light emitting display panel, a quantum dot light emitting display panel, a micro light emitting diode display panel, and an electrophoresis display panel, but embodiments are not limited thereto. For example, the display panel 100 may use any display panel that may be vibrated by the sound generation device 300 to generate a sound wave.

The display panel 100 according to an example embodiment may include a thin film transistor (TFT) array substrate which includes a plurality of pixels defined by intersections of a plurality of gate lines and a plurality of data lines and a TFT provided in each of the plurality of pixels to drive a corresponding pixel, an organic light emitting device layer provided on the TFT array substrate, and an encapsulation substrate covering the organic light emitting device layer. Here, the encapsulation substrate may protect the TFT and the organic light emitting device layer from an external impact and may prevent water from penetrating into the organic light emitting device layer.

The sound generation device 300 may vibrate the display panel 100 according to driving (or vibration) of at least one vibration generation module 310 to allow a sound SW, generated based on the vibration of the display panel 100, to be directly output to a region FD in front of the display panel 100. For example, the sound generation device 300 may generate sound by using the display panel 100 as a vibration plate, and thus, may be referred to as a vibration generation device.

The sound generation device 300 according to the first embodiment of the present disclosure may include one vibration generation module 310 which vibrates according to a sound signal (or a vibration driving signal) provided from a sound driving circuit to vibrate the display panel 100.

The vibration generation module 310 according to the first embodiment of the present disclosure may include a vibration element 311 and a vibration reflecting member 313.

The vibration element 311 may be disposed on a rear surface of the display panel 100 and may repeatedly contract and expand according to an inverse piezoelectric effect of a piezoelectric material based on the sound signal provided from the sound driving circuit, thereby vibrating the display panel 100. The vibration element 311 according to an embodiment may include a piezoelectric material layer having a piezoelectric effect, a first electrode disposed on a front surface of the piezoelectric material layer, and a second electrode disposed on a rear surface of the piezoelectric material layer. Because the vibration element 311 includes the piezoelectric material, the vibration element 311 may be referred to as a piezoelectric element.

The piezoelectric material layer may include a piezoelectric material which vibrates with an electric field. Here, the piezoelectric material may have a characteristic in which as pressure is applied to the material, or as twisting occurs in a crystalline structure of the material due to an external force, a potential difference is caused by dielectric polarization based on a relative position change of a positive (+) ion and a negative (−) ion, and vibration occurs due to an electric field based on an applied voltage. For example, the piezoelectric material layer may have a parallelepiped structure or a hexahedral structure of a square or a rectangular shape.

The piezoelectric material layer according to an embodiment may include a polymer material-containing piezoelectric material, a thin film material-containing piezoelectric material, a composite material-containing piezoelectric material, a single crystalline ceramic piezoelectric material, or a polycrystalline ceramic piezoelectric material. Examples of the polymer material-containing piezoelectric material according to an embodiment may include polyvinylidene difluoride (PVDF), polyvinylidene fluoride-co-trifluoroethylene (P(VDF-TrFe)), and P(VDFTeFE). Examples of the thin film material-containing piezoelectric material according to an embodiment may include ZnO, CdS, and AlN. Examples of the composite material-containing piezoelectric material may include PZT(lead zirconate titanate)-PVDF, PZT-silicon rubber, PZT-epoxy, PZT-foam polymer, and PZT-foam urethane. Examples of the single crystalline ceramic piezoelectric material according to an embodiment may include $\alpha$-$AlPO_4$, $\alpha$-$SiO_2$, $LiNbO_3$, $Tb_2(MoO_4)_3$, $Li_2B_4O_7$, and ZnO. Examples of the polycrystalline ceramic piezoelectric material according to an embodiment may include a PZT-based ceramic piezoelectric material, a PT-based ceramic piezoelectric material, a PZT-complex perovskite-based ceramic piezoelectric material, and $BaTiO_3$.

The first electrode and the second electrode according to an embodiment may be provided to overlap each other with the piezoelectric material layer therebetween. The first electrode and the second electrode may each include an opaque metal material which is relatively low in resistance and is good in heat dissipation characteristic, but are not limited thereto. In other embodiments, the first electrode and the second electrode may each include a transparent conductive material or a conductive polymer material.

The vibration element 311 may have a sound output characteristic of a high-pitched sound band which is relatively better than a sound output characteristic of a low-pitched sound band, and thus, may increase a sound pressure level and a frequency characteristic of a high-pitched sound band of a sound generated based on a vibration of the display panel 100. For example, a high-pitched sound band frequency may be 3 kHz or more, and a low-pitched sound band frequency may be 1 kHz or less. However, the present embodiment is not limited thereto.

The vibration element 311 according to an embodiment may be disposed on a rear surface 100*a* of the display panel 100 by an adhesive member 312. For example, an entire front surface of the vibration element 311 may be disposed on the rear surface 100*a* of the display panel 100 by the adhesive member 312.

The adhesive member 312 according to an embodiment may include a double-sided tape or a naturally curable adhesive. Here, in a case where the adhesive member 312 may include a thermo-hardening adhesive or a photo-hardening adhesive, a characteristic of the vibration element 311 may be reduced by heat used in a curing process of curing the adhesive member 312. Thus, the adhesive member 312 may include a double-sided tape or a naturally curable adhesive.

The vibration reflecting member 313 may be disposed on the rear surface 100*a* of the display panel 100 to be spaced apart from the vibration element 311. For example, the vibration reflecting member 313 may be attached on the rear surface 100*a* of the display panel 100 by a connection member 314. The connection member 314 according to an embodiment may be implemented with a double-sided tape or a double-sided adhesive foam pad, but is not limited thereto. The vibration reflecting member 313 may reflect vibration, propagated (or transferred) in a first direction X according to a vibration (or contraction and expansion) of the vibration element 311, to the vibration element 311. The reflected vibration (or a reflected wave) reflected by the vibration reflecting member 313 may amplify vibration energy near the vibration element 311 to improve a vibration frequency characteristic of a low-pitched sound band. In other words, the vibration reflecting member 313 may act as a mass for vibration of the display panel 100.

Figure 5A:
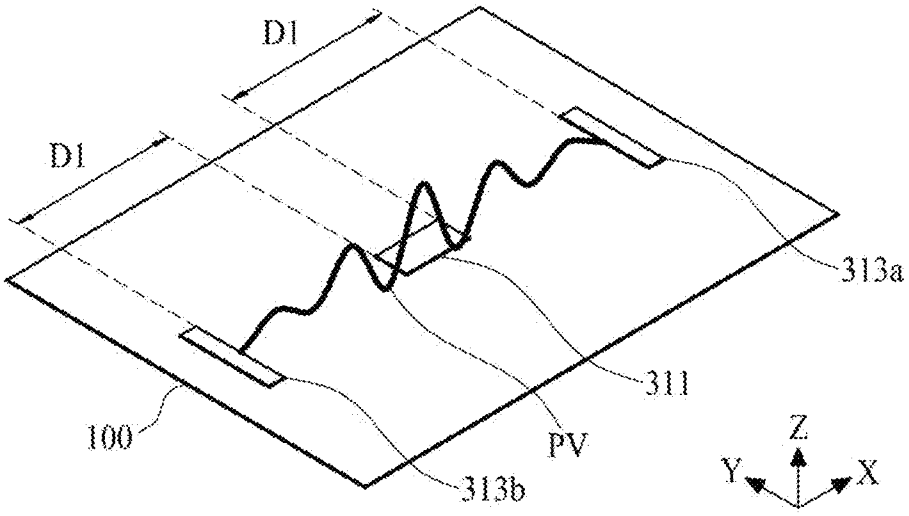
FIG. 5A is a diagram illustrating a damping effect of a display panel according to an embodiment of the present disclosure.

The vibration reflecting member 313 may also reflect a vibration (hereinafter referred to as a panel vibration) of the display panel 100, caused by a vibration of the vibration element 311, to the vibration element 311 to generate the reflected vibration. In this case, as illustrated in FIG. 5A, the panel vibration may be progressively attenuated by a damping effect of the display panel 100 and may be propagated to the vibration reflecting member 313. The reflected vibration may have a phase based on the damping effect of the display panel 100 and a first distance D1 between the vibration element 311 and the vibration reflecting member 313. Here, the damping effect of the display panel 100 may be dissipation of vibration energy based on time or a distance and may represent a damping force of amplitude which is progressively reduced with time.

Figure 5B:
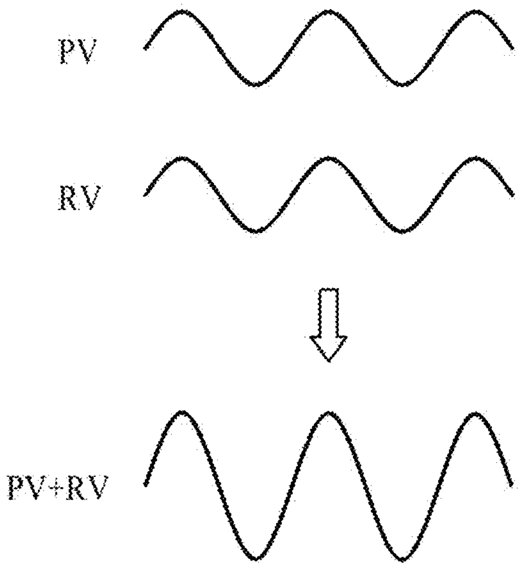
FIG. 5B is a waveform diagram showing constructive interference according to an embodiment of the present disclosure.
Figure 5C:
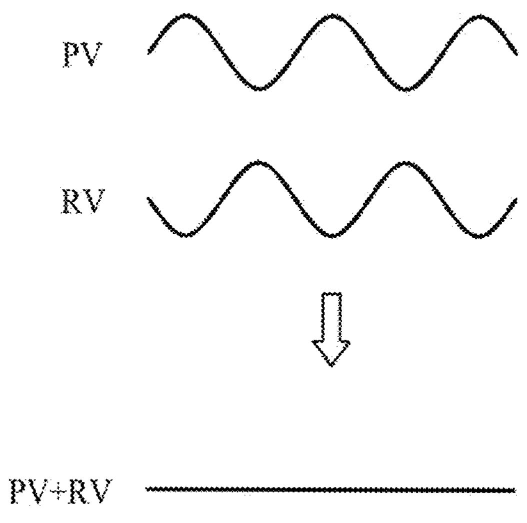
FIG. 5C is a waveform diagram showing destructive interference according to an embodiment of the present disclosure.

Vibration near the vibration element 311, as illustrated in FIG. 5B, may be amplified by constructive interference between a panel vibration PV and a reflected vibration RV, based on a first distance D1 between the vibration element 311 and the vibration reflecting member 313, but as illustrated in FIG. 5C, may be offset by destructive interference between the panel vibration PV and the reflected vibration RV. For example, as the vibration reflecting member 313 is located relatively farther away from the vibration element 311, a reflection effect is reduced due to the damping effect of the display panel 100. Also, as the vibration reflecting member 313 is located relatively closer to the vibration element 311, a vibration area of the display panel 100 is reduced. Therefore, the vibration reflecting member 313 may be spaced apart from the vibration element 311 by a wavelength distance of the panel vibration PV or by a distance which is not affected by the damping effect of the display panel 100. Thus, the vibration near the vibration element 311 may be amplified by the reflected vibration RV, thereby improving a sound pressure characteristic of a sound generated based on the vibration of the display panel 100.

The first distance D1 (or a shortest distance) between the vibration element 311 and the vibration reflecting member 313 according to an embodiment may be 60 mm to 100 mm. Here, if the first distance D1 between the vibration element 311 and the vibration reflecting member 313 is less than 60 mm, the vibration area of the display panel 100 based on the vibration of the vibration element 311 may be reduced, and thus, a sound pressure may be reduced, whereby an effect of the vibration reflecting member 313 may not be as good as expected. Also, if the first distance D1 between the vibration element 311 and the vibration reflecting member 313 is more than 100 mm, due to the damping effect of the display panel 100, a vibration reflection effect of the vibration reflecting member 313 and the vibration of the vibration element 311 may be reduced, and for this reason, the effect of the vibration reflecting member 313 may not be as good as expected. Accordingly, in order to secure the vibration area of the display panel 100 based on the vibration of the vibration element 311 and increase the vibration reflection effect of the vibration reflecting member 313, the first distance D1 between the vibration element 311 and the vibration reflecting member 313 may be adjusted to 60 mm to 100 mm.

With reference again to FIGS. 1 to 4, the vibration reflecting member 313 according to an embodiment may include a pair of metal bars 313*a* and 313*b*.

Each of the pair of metal bars 313*a* and 313*b* may be spaced apart from the vibration element 311 and may be disposed on the rear surface 100*a* of the display panel 100 by using the connection member 314. For example, the first distance D1 between the vibration element 311 and each of the pair of metal bars 313*a* and 313*b* may be adjusted to 60 mm to 100 mm. Each of the pair of metal bars 313*a* and 313*b* may have a weight (or a mass), and thus, may increase an inertia moment of the display panel 100 based on the vibration of the vibration element 311. For example, when the display panel 100 vibrates based on the vibration of the vibration element 311, each of the pair of metal bars 313*a* and 313*b* may decrease a resonant frequency "$f_0$" of the display panel 100 according to a weight as expressed in the following Equation (1), thereby improving a frequency characteristic of a low-pitched sound band of a sound generated based on the vibration of the display panel 100:

$$f_0 = \frac{1}{2\pi} \times \sqrt{\frac{s}{m}} \tag{1}$$

where $f_0$ denotes a resonant frequency, s denotes stiffness, and m denotes a weight (or a mass).

Each of the pair of metal bars 313*a* and 313*b* according to an embodiment may have a weight (or a mass) which is adjusted to 10% to 90% of a total weight of the display panel 100. In this case, as a weight of each of the pair of metal bars 313*a* and 313*b* increases, the resonant frequency of the display panel 100 is reduced, but a total weight of the display apparatus increases in proportion to the increased weight. Therefore, a weight of each of the pair of metal bars 313*a* and 313*b* may be adjusted for a reproduction frequency band and a sound pressure level of a sound output based on the vibration of the display panel 100. The vibration reflecting member 313 including the pair of metal bars 313*a* and 313*b* may act as a mass for the vibration of the display panel 100, and thus, may be referred to as a weight member or a mass member.

The pair of metal bars 313*a* and 313*b* may be disposed in parallel with the vibration element 311 therebetween. For example, the pair of metal bars 313*a* and 313*b* may be disposed in parallel with the vibration element 311 therebetween along a first direction X and may be disposed in parallel along a second direction Y intersecting the first direction X. Here, the first direction X may be a direction parallel to a long-side direction of the display panel 100, and the second direction Y may be a direction parallel to a short-side direction of the display panel 100.

Each of the pair of metal bars 313_a_ and 313_b_ according to an embodiment may include a pair of first sides which have a first length L1 and are parallel to the first direction X, a pair of second sides which have a second length L2 and are parallel to the second direction Y, and a certain thickness. For example, each of the pair of metal bars 313_a_ and 313_b_ may have a rectangular parallelepiped structure or a rectangular hexahedral structure where each of the pair of first sides has a length shorter than that of each of the pair of second sides.

Each of the pair of metal bars 313_a_ and 313_b_ according to an embodiment may be formed of a metal material, and for example, may be formed of one of an aluminum (Al) material, a magnesium (Mg) material, an Al alloy material, a Mg alloy material, and a magnesium-lithium (Mg—Li) alloy material.

A rear mechanical structure 500 may be disposed on the rear surface 100_a_ of the display panel 100 to support a rear periphery of the display panel 100. The rear mechanical structure 500 may cover the rear surface 100_a_ of the display panel 100 and a rear surface of the sound generation device 300.

The rear mechanical structure 500 according to an embodiment may be implemented with a cover bottom which is disposed on the rear surface 100_a_ of the display panel 100, or may be implemented with a middle cabinet which is connected to a cover bottom, surrounds a side surface of the display panel 100, accommodates one periphery of the display panel 100, and supports the display panel 100. For example, the middle cabinet may include a '⊣'-shaped cross-sectional surface. The rear mechanical structure 500 may be implemented with the cover bottom or the middle cabinet connected to the cover bottom, but is not limited thereto. In other embodiments, the rear mechanical structure 500 may be implemented in a structure which covers the rear surface 100_a_ of the display panel 100 or covers all of the rear surface 100_a_ and the side surface of the display panel 100.

Herein, the rear mechanical structure 500 may be referred to as a cover bottom, a plate bottom, a back cover, a base frame, a metal frame, a metal chassis, a chassis base, or an m-chassis. Therefore, the rear mechanical structure 500 may be a supporter for supporting the display panel 100 and may be implemented as any type of frame or plate-shaped structure disposed on a rear surface of the display apparatus.

The rear mechanical structure 500 according to an embodiment may include at least one of a glass material, a metal material, and a plastic material which has a plate shape and covers the entire rear surface 100_a_ of the display panel 100 with a gap space GS therebetween. Here, a periphery or a sharp corner of the rear mechanical structure 500 may have a sloped shape or a curved shape through a chamfer process or a corner rounding process. In an example, the rear mechanical structure 500 including the glass material may include sapphire glass. As another example, the rear mechanical structure 500 including the metal material may include one of Al, an Al alloy, a Mg alloy, and an iron (Fe)-nickel (Ni) alloy. As another example, the rear mechanical structure 500 may have a stacked structure including a glass plate and a metal plate which has a thickness relatively thinner than the glass plate and faces the rear surface 100_a_ of the display panel 100.

The rear mechanical structure 500 according to an embodiment may be disposed in the rear periphery of the display panel 100 by using a panel fixing member 400. The panel fixing member 400 may be disposed between the periphery of the rear surface of the display panel 100 and a periphery of the rear mechanical structure 500 and may attach the display panel 100 on the rear mechanical structure 500. The panel fixing member 400 according to an embodiment may be implemented with a double-sided tape or a double-sided adhesive foam pad, but is not limited thereto.

A front surface 500_a_ of the rear mechanical structure 500 according to an embodiment may be spaced apart from a rear surface of the sound generation device 300. The front surface 500_a_ of the rear mechanical structure may be defined as the surface of the rear mechanical structure 500 arranged opposite to the rear surface 100_a_ of the display panel 100. For example, the front surface 500_a_ of the rear mechanical structure 500 may be spaced apart from a rear surface of the vibration element 311 and may be spaced apart from a rear surface of the vibration reflecting member 313. A separation space DS between the front surface 500_a_ of the rear mechanical structure 500 and the rear surface of the sound generation device 300 prevents noise from occurring due to a physical contact between the rear mechanical structure 500 and the vibration element 311 when the vibration element 311 vibrates and enables a smooth vibration of the vibration element 311 and a free deformation of the display panel 100 caused by the smooth vibration, thereby increasing a vibration amplitude of the display panel 100 to improve a sound pressure characteristic of a sound generated based on a vibration of the display panel 100. Therefore, the panel fixing member 400 according to an embodiment may have a thickness which is thicker than a total thickness of the vibration generation module 310 disposed on the rear surface 100_a_ of the display panel 100, in order for the front surface 500_a_ of the rear mechanical structure 500 to be spaced apart from the rear surface of the sound generation device 300.

As described above, the display apparatus according to the first embodiment of the present disclosure may output a sound, generated based on a vibration of the display panel 100 caused by driving of the sound generation device 300 disposed on the rear surface of the display panel 100, to the front surface FD of the display panel 100, thereby increasing a viewer's immersion. Also, the display apparatus according to the first embodiment of the present disclosure may include the at least one vibration generation module 310 which includes the vibration element 311, having the piezoelectric element disposed on the rear surface of the display panel 100, and the vibration reflecting member 313 spaced apart from the vibration element 311. Therefore, vibration energy near the vibration element 311 may be amplified through reflection of vibration by the vibration reflecting member 313, thereby improving a sound pressure characteristic of a sound generated based on a vibration of the display panel 100. Also, a resonant frequency of the display panel 100 may be reduced by a weight of the vibration reflecting member 313, thereby improving a frequency characteristic of a low-pitched sound band of the sound generated based on the vibration of the display panel 100. Accordingly, the display apparatus according to the first embodiment of the present disclosure may output a sound by using a vibration of the vibration element 311 including the piezoelectric material layer and a vibration of the display panel 100 caused by reflection of vibration by the vibration reflecting member 313, and thus, a sound having an enhanced sound pressure characteristic and frequency characteristic of a low-pitched sound band as well as a high-pitched sound band may be provided to viewers.

Figure 6:
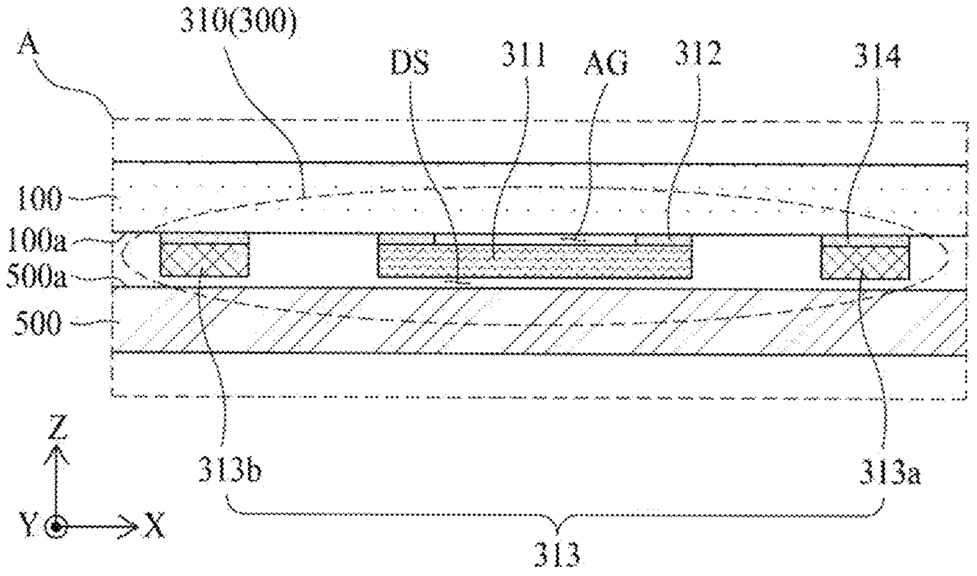
FIG. 6 is another enlarged view of a portion A illustrated in FIG. 2.

FIG. 6 is another enlarged view of a portion A illustrated in FIG. 2 and illustrates an example which is implemented by modifying an attachment structure between a display panel and a vibration element, in the display apparatus according to the first embodiment of the present disclosure illustrated in FIGS. 1 to 4. Hereinafter, therefore, only an attachment structure between a display panel and a vibration element will be described, and descriptions of the other elements are omitted.

With reference to FIG. 6, a portion of a front surface of a vibration element 311 according to the present embodiment may be disposed on a rear surface 100*a* of a display panel 100 by using an adhesive member 312. For example, the vibration element 311 may be disposed on the rear surface 100*a* of the display panel 100 with an air gap AG therebetween.

The air gap AG enables the vibration element 311 and the display panel 100 to independently vibrate without interference with each other. Also, the air gap AG enables a smooth vibration of the vibration element 311 and a free deformation of the display panel 100 caused by the smooth vibration, thereby increasing a vibration amplitude of the display panel 100 to improve a sound pressure characteristic of a sound generated based on a vibration of the display panel 100.

The adhesive member 312 according to the present embodiment may be disposed between the rear surface 100*a* of the display panel 100 and a periphery of a front surface of the vibration element 311. According to another embodiment, the adhesive member 312 may be disposed between the rear surface 100*a* of the display panel 100 and each of one periphery and the other periphery of the front surface of the vibration element 311. The adhesive member 312 may allow a center of the vibration element 311 to be spaced apart from the rear surface 100*a* of the display panel 100, or may provide the air gap AG between the rear surface 100*a* of the display panel 100 and the center of the vibration element 311.

Because a display apparatus according to the present embodiment includes the air gap AG provided between the rear surface 100*a* of the display panel 100 and the vibration element 311, a sound pressure characteristic and a frequency characteristic of a sound output based on a vibration of the display panel 100 may be further improved.

Figure 7:
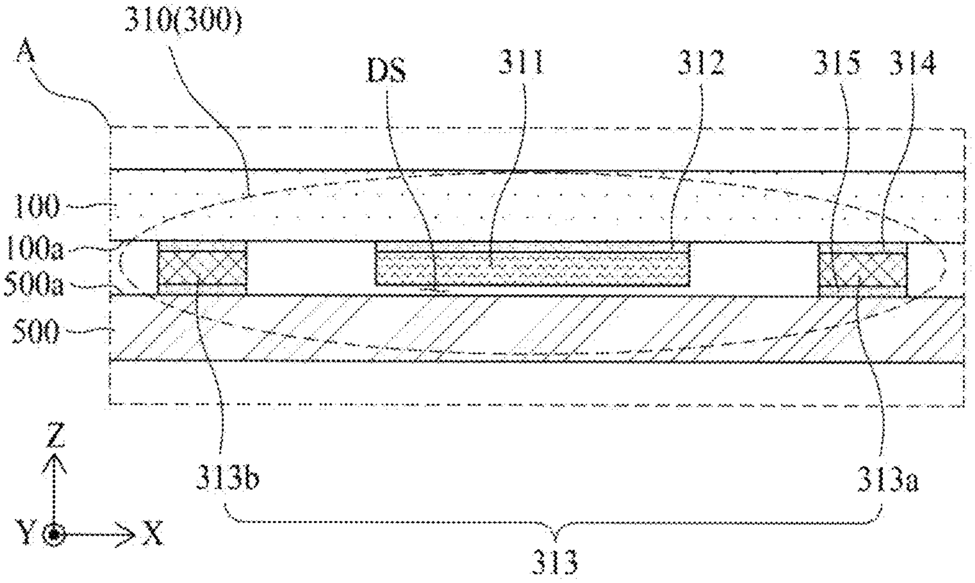
FIG. 7 is another enlarged view of a portion A illustrated in FIG. 2.

FIG. 7 is another enlarged view of a portion A illustrated in FIG. 2 and illustrates an example which is implemented by modifying a disposition structure of a vibration reflecting member, in the display apparatus according to the first embodiment of the present disclosure illustrated in FIGS. 1 to 4. Hereinafter, therefore, only a disposition structure of a vibration reflecting member will be described, and descriptions of the other elements are omitted.

With reference to FIG. 7, a vibration reflecting member 313 according to the present embodiment may include a pair of metal bars 313*a* and 313*b*, and each of the pair of metal bars 313*a* and 313*b* may be attached on a rear surface 100*a* of a display panel 100 by a first connection member 314 and may be attached on a front surface 500*a* of a rear mechanical structure 500 by a second connection member 315. A front surface of each of the pair of metal bars 313*a* and 313*b* may be disposed on the rear surface 100*a* of the display panel 100 by using the first connection member 314 and may be spaced apart from the vibration element 311. A rear surface of each of the pair of metal bars 313*a* and 313*b* according to the present embodiment may be disposed on the front surface 500*a* of the rear mechanical structure 500 by using the second connection member 315 and may be spaced apart from the vibration element 311. The first and second connection members 314 and 315 according to an embodiment may each be implemented with a double-sided tape or a double-sided adhesive foam pad, but are not limited thereto.

The vibration reflecting member 313 according to the present embodiment may contact the rear mechanical structure 500 to increase the weight "m" in Equation (1), and thus, may decrease a resonant frequency of the display panel 100, thereby improving a frequency characteristic of a low-pitched sound band of a sound generated based on a vibration of the display panel 100.

Moreover, in FIG. 7, an entire portion of a front surface of the vibration element 311 is illustrated as being attached on the rear surface 100*a* of the display panel 100 by an adhesive member 312, but is not limited thereto. In other embodiments, as illustrated in FIG. 6, the vibration element 311 may be disposed on the rear surface 100*a* of the display panel 100 with an air gap AG therebetween.

A display apparatus according to the present embodiment has the same effect as that of the display apparatus illustrated in FIGS. 1 to 6. In the display apparatus according to the present embodiment, the vibration reflecting member 313 may contact the rear mechanical structure 500, and thus, may decrease a resonant frequency of the display panel 100, thereby improving a frequency characteristic of a low-pitched sound band of a sound generated based on a vibration of the display panel 100.

Figure 8:
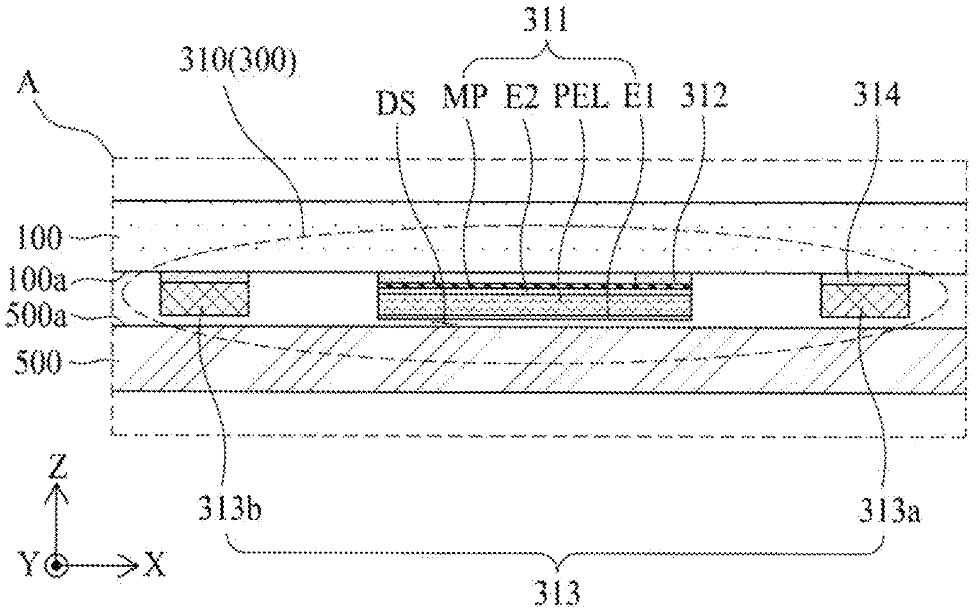
FIG. 8 is another enlarged view of a portion A illustrated in FIG. 2.

FIG. 8 is another enlarged view of a portion A illustrated in FIG. 2 and illustrates an example which is implemented by modifying a structure of each of a display panel and a vibration element, in the display apparatus illustrated in FIG. 6. Hereinafter, therefore, only a structure of a vibration element will be described, and descriptions of the other elements are omitted.

With reference to FIG. 8, a vibration element 311 according to the present embodiment may include a piezoelectric material layer PEL having a piezoelectric effect, a first electrode E1 disposed on a front surface of the piezoelectric material layer PEL, a second electrode E2 disposed on a rear surface of the piezoelectric material layer PEL, and a metal plate MP disposed on a front surface of the first electrode E1.

The piezoelectric material layer PEL, the first electrode E1, and the second electrode E2 are the same as the above-described elements, and thus, their detailed descriptions are not repeated.

The metal plate MP may be provided on a front surface of the first electrode E1 and may be disposed on a rear surface 100*a* of a display panel 100 by using an adhesive member 312. The metal plate MP increases the weight "m" in Equation (1), and thus, may decrease a resonant frequency of the display panel 100, thereby improving a frequency characteristic of a low-pitched sound band of a sound generated based on a vibration of the display panel 100.

A portion of a front surface of the metal plate MP according to an embodiment may be disposed on the rear surface 100*a* of the display panel 100 by using an adhesive member 312, and in this case, the vibration element 311 may be disposed on the rear surface 100*a* of the display panel with an air gap AG therebetween.

According to another embodiment, as illustrated in FIG. 3, the entire portion of the front surface of the metal plate MP may be disposed on the rear surface 100*a* of the display panel 100 by using the adhesive member 312.

And, as illustrated in FIG. 7, a pair of metal bars 313*a* and 313*b* configuring a vibration reflecting member 313 of a display apparatus according to the present embodiment may be attached on the rear surface 100*a* of the display panel 100 by a first connection member 314 and may be attached on a front surface 500*a* of a rear mechanical structure 500 by a second connection member 315.

In the display apparatus according to the present embodiment, due to the vibration element 311 including the metal plate MP, a resonant frequency of the display panel 100 may be further reduced, thereby further improving a frequency characteristic of a low-pitched sound band of a sound generated based on a vibration of the display panel 100.

Figure 9:
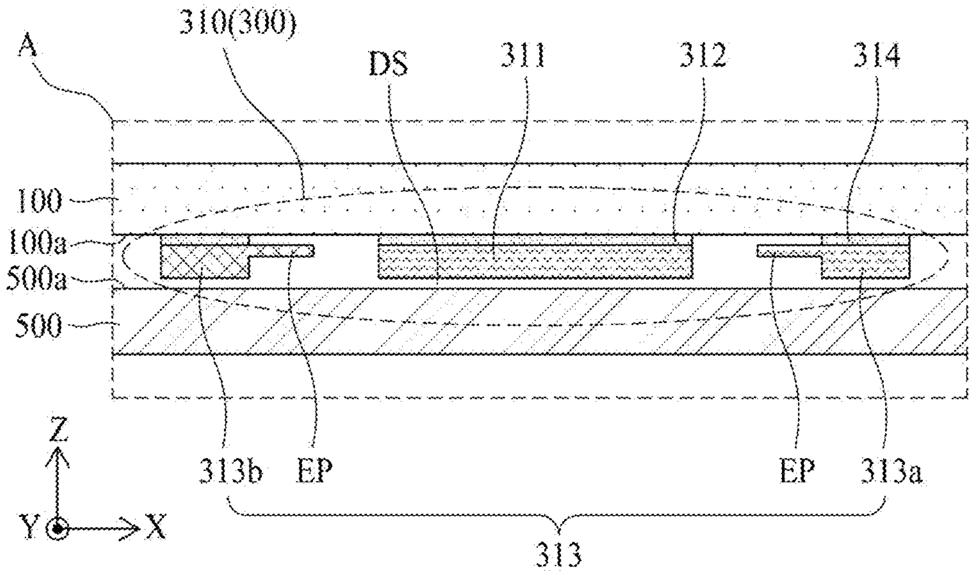
FIG. 9 is another enlarged view of a portion A illustrated in FIG. 2.
Figure 10:
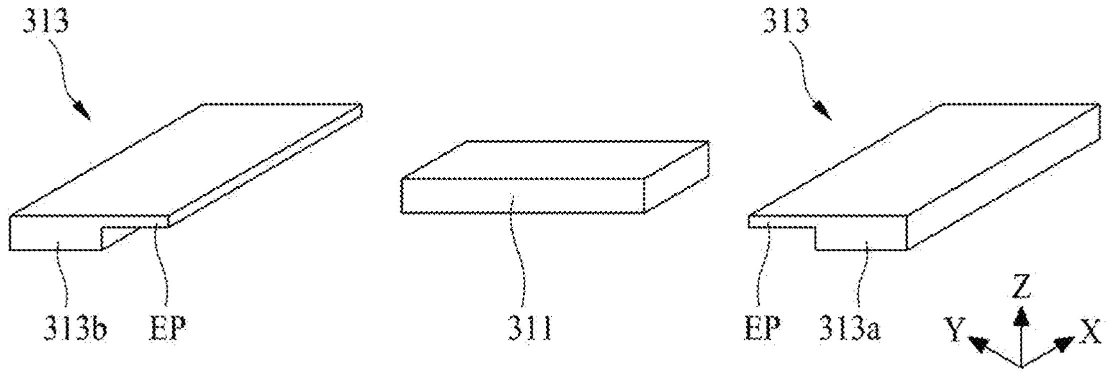
FIG. 10 is a diagram illustrating a vibration generation module illustrated in FIG. 9.

FIG. 9 is another enlarged view of a portion A illustrated in FIG. 2, and FIG. 10 is a diagram illustrating a vibration generation module illustrated in FIG. 9. FIGS. 9 and 10 illustrate an example which is implemented by modifying a structure of a pair of metal bars configuring a vibration reflecting member, in the display apparatus illustrated in FIGS. 1 to 4. Hereinafter, therefore, only a pair of metal bars will be described, and descriptions of the other elements are omitted.

With reference to FIGS. 9 and 10, in a display apparatus according to the present embodiment, each of a pair of metal bars 313*a* and 313*b* configuring a vibration reflecting member 313 may further include an extension part EP extending to a vibration element 311.

The extension part EP may protrude in a first direction X from an upper portion of an inner side of each of the pair of metal bars 313*a* and 313*b* facing a second side of the vibration element 311 to have a certain length. When a corresponding metal bar of the pair of metal bars 313*a* and 313*b* vibrates based on a vibration of the display panel 100, the extension part EP may increase an inertia moment of the corresponding metal bar of the pair of metal bars 313*a* and 313*b* to increase a vibration amplitude of the corresponding metal bar of the pair of metal bars 313*a* and 313*b*, thereby decreasing a resonant frequency of the display panel 100. Here, the extension part EP may protrude in the first direction X from an upper portion of an outer side of each of the pair of metal bars 313*a* and 313*b*, which does not face the second side of the vibration element 311, to have a certain length. In this case, when a corresponding metal bar of the pair of metal bars 313*a* and 313*b* vibrates based on the vibration of the display panel 100, an inertia moment of the corresponding metal bar of the pair of metal bars 313*a* and 313*b* may be reduced, and thus, a vibration amplitude of the corresponding metal bar of the pair of metal bars 313*a* and 313*b* may be reduced, thereby decreasing a vibration amplitude of each of the pair of metal bars 313*a* and 313*b*.

The display apparatus according to the present embodiment may have the same effect as that of the display apparatus illustrated in FIGS. 1 to 4, and particularly, due to the extension part EP of each of the pair of metal bars 313*a* and 313*b*, a resonant frequency of the display panel 100 may be further reduced, thereby further improving a frequency characteristic of a low-pitched sound band of a sound generated based on a vibration of the display panel 100.

In the display apparatus according to the present embodiment, the vibration element 311 may be disposed on a rear surface 100*a* of the display panel 100 with an air gap AG therebetween as illustrated in FIG. 6, and as illustrated in FIG. 8, may include a metal plate MP. Also, as illustrated in FIG. 7, the pair of metal bars 313*a* and 313*b* each including the extension part EP may be attached on the rear surface 100*a* of the display panel 100 by a first connection member 314 and may be attached on a front surface 500*a* of a rear mechanical structure 500 by a second connection member 315.

Figure 11:
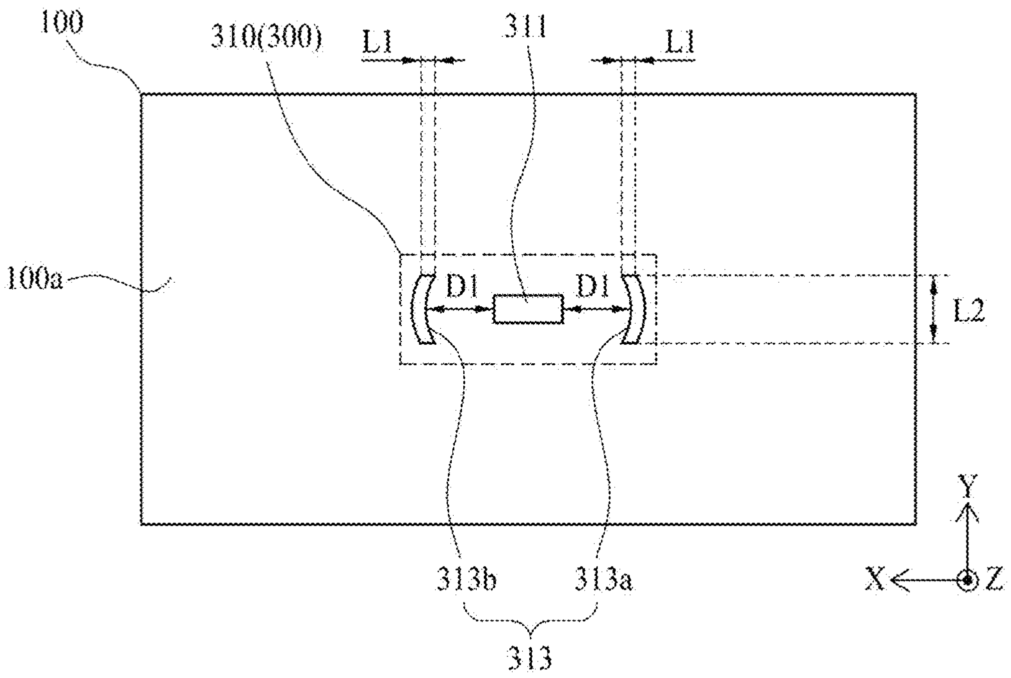
FIG. 11 is a diagram illustrating a vibration generation module according to a second embodiment of the present disclosure.

FIG. 11 is a diagram illustrating a vibration generation module according to a second embodiment of the present disclosure and illustrates an example which is implemented by modifying a structure of a pair of metal bars configuring a vibration reflecting member, in the display apparatus illustrated in FIGS. 1 to 10. Hereinafter, therefore, only a structure of a pair of metal bars will be described, and descriptions of the other elements are omitted.

With reference to FIG. 11, in a display apparatus according to the present embodiment, a pair of metal bars 313*a* and 313*b* configuring a vibration reflecting member 313 may be disposed in parallel with a vibration element 311 therebetween to each have a concavely curved shape with respect to the vibration element 311.

Each of the pair of metal bars 313*a* and 313*b* according to an embodiment may have a planarly and concavely curved shape. For example, each of the pair of metal bars 313*a* and 313*b* may include a pair of first sides which are parallel to each other in a first direction X and have a first length L1, a pair of second sides which are disposed in a second direction Y, have a second length L2, and include a concave part facing the vibration element 311, and a certain thickness. The concave part may have a curvature radius corresponding to a vibration waveform which is transferred based on a vibration of the vibration element 311. In this case, a first distance D1 between the concave part and the vibration element 311 may be adjusted to 60 mm to 100 mm. Each metal bar in the pair of metal bars 313*a* and 313*b* may have a concavely curved shape with respect to the vibration element 311 and may effectively reflect vibration which is propagated (or transferred) in the first direction X according to a vibration (or contraction and expansion) of the vibration element 311.

Because the display apparatus according to the present embodiment includes the vibration reflecting member 313 including the pair of metal bars 313*a* and 313*b* having a concavely curved shape with respect to the vibration element 311, vibration energy near the vibration element 311 may be amplified more through effective reflection of vibration by the vibration reflecting member 313, thereby further improving a sound pressure characteristic of a sound generated based on a vibration of the display panel 100.

Figure 12:
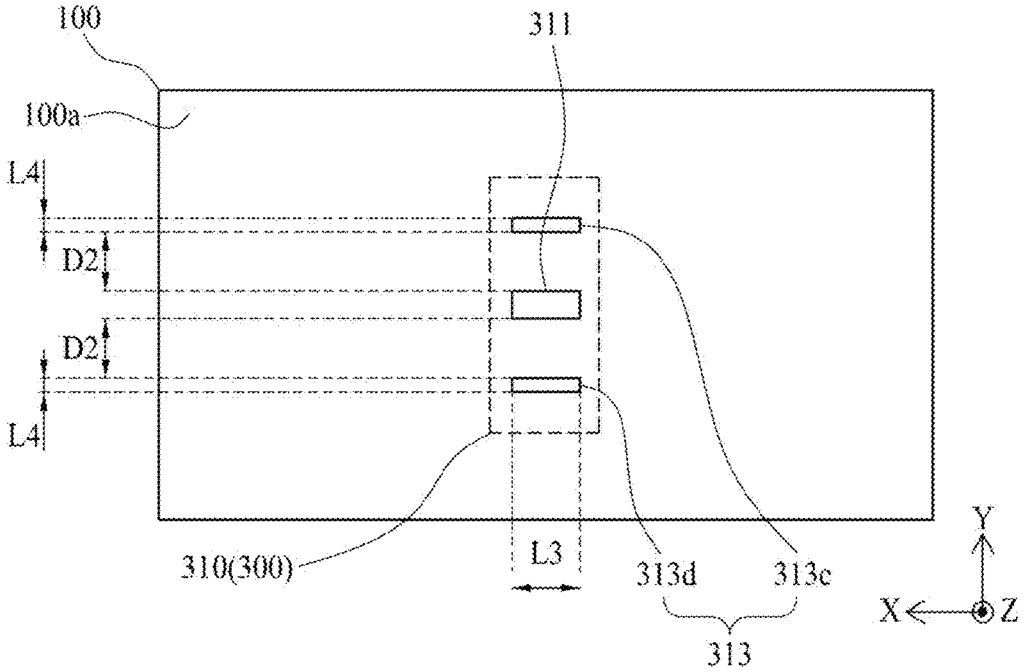
FIG. 12 is a diagram illustrating a vibration generation module according to a third embodiment of the present disclosure.

FIG. 12 is a diagram illustrating a vibration generation module according to a third embodiment of the present disclosure and illustrates an example which is implemented by modifying a disposition structure of a pair of metal bars configuring a vibration reflecting member, in the display apparatus illustrated in FIGS. 1 to 10. Hereinafter, therefore, only a disposition structure of a pair of metal bars will be described, and descriptions of the other elements are omitted.

With reference to FIG. 12, in a display apparatus according to the present embodiment, a pair of metal bars 313*c* and 313*d* configuring a vibration reflecting member 313 may be disposed in parallel in a second direction Y with a vibration element 311 therebetween and may be disposed in parallel in a first direction X.

Each of the pair of metal bars 313*c* and 313*d* may include a pair of first sides which have a third length L3 and are parallel to the first direction X, a pair of second sides which have a fourth length L4 and are parallel to the second direction Y, and a certain thickness. For example, each of the pair of metal bars 313*c* and 313*d* may have a rectangular parallelepiped structure where each of the pair of first sides has a length longer than that of each of the pair of second sides.

Each of the pair of metal bars 313*c* and 313*d* according to an embodiment may be disposed on a rear surface 100*a* of a display panel 100 by using a connection member and may be spaced apart from the vibration element 311. For example, a second distance D2 between each of the pair of metal bars 313*c* and 313*d* and the vibration element 311 may be adjusted to 60 mm to 100 mm. Each of the pair of metal bars 313*c* and 313*d* may reflect vibration, which is propagated (or transferred) in the second direction Y according to a vibration (or contraction and expansion) of the vibration element 311, to the vibration element 311. A reflected vibration (or a reflected wave) reflected by the vibration reflecting member 313 may amplify vibration energy near the vibration element 311, thereby improving a vibration frequency characteristic of a low-pitched sound band.

Each of the pair of metal bars 313*c* and 313*d* according to an embodiment may have a weight (or a mass) which is adjusted to 10% to 90% of a total weight of the display panel 100. Therefore, because each of the pair of metal bars 313*c* and 313*d* has a weight (or a mass), an inertia moment of the display panel 100 based on a vibration of the vibration element 311 may increase. For example, when the display panel 100 vibrates based on the vibration of the vibration element 311, each of the pair of metal bars 313*c* and 313*d* according to the present embodiment may decrease a resonant frequency "$f_0$" of the display panel 100 according to a weight as expressed in Equation (1), thereby improving a frequency characteristic of a low-pitched sound band of a sound generated based on the vibration of the display panel 100.

The display apparatus according to the present embodiment may have the same effect as that of the display apparatus illustrated in FIGS. 1 to 4.

In the display apparatus according to the present embodiment, the vibration element 311 may be disposed on a rear surface 100*a* of the display panel 100 with the air gap AG therebetween as illustrated in FIG. 6, and as illustrated in FIG. 8, may include the metal plate MP. Also, as illustrated in FIG. 7, the pair of metal bars 313*c* and 313*d* may be attached on the rear surface 100*a* of the display panel 100 by the first connection member 314 and may be attached on the front surface 500*a* of the rear mechanical structure 500 by the second connection member 315. Also, as illustrated in FIG. 9, each metal bar in the pair of metal bars 313*c* and 313*d* may include the extension part EP. And, as illustrated in FIG. 11, each metal bar in the pair of metal bars 313*c* and 313*d* may have a concavely curved shape with respect to the vibration element 311.

Figure 13:
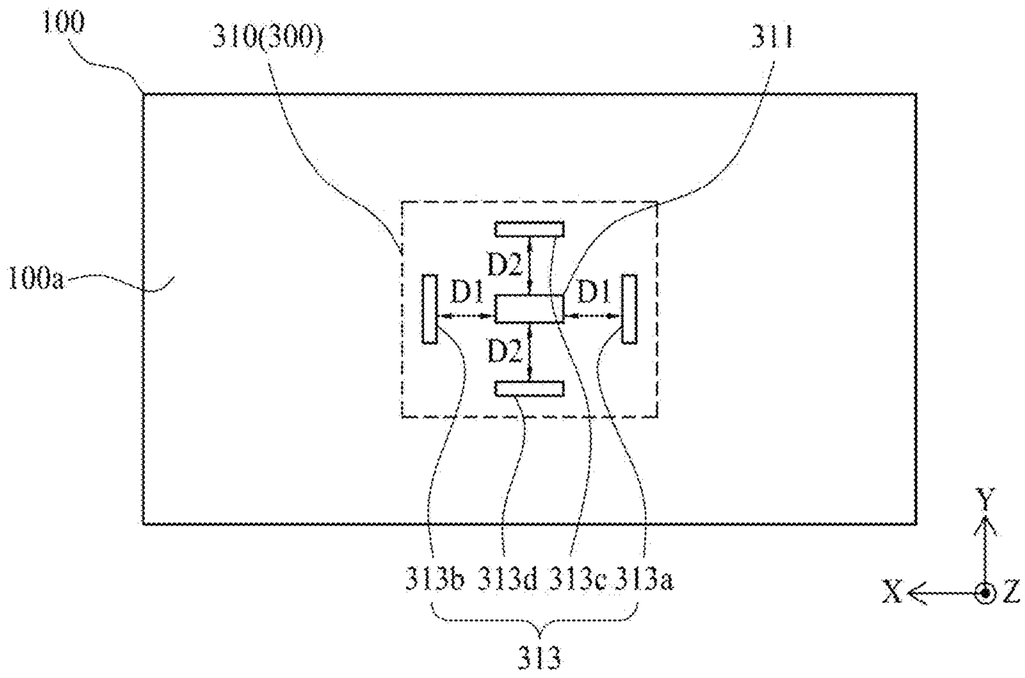
FIG. 13 is a diagram illustrating a vibration generation module according to a fourth embodiment of the present disclosure.

FIG. 13 is a diagram illustrating a vibration generation module according to a fourth embodiment of the present disclosure and illustrates an example where a vibration reflecting member of a vibration generation module is provided in each of the display apparatus illustrated in FIG. 4 and the display apparatus illustrated in FIG. 12. Hereinafter, therefore, only a vibration reflecting member will be described, and descriptions of the other elements are omitted.

With reference to FIG. 13, in a display apparatus according to the present embodiment, a vibration reflecting member 313 may include a pair of first metal bars 313*a* and 313*b* and a pair of second metal bars 313*c* and 313*d*.

The pair of first metal bars 313*a* and 313*b* may be disposed on a rear surface 100*a* of a display panel 100 in parallel in a first direction X with a vibration element 311 therebetween with respect to the first direction X. In this case, a first distance D1 between each of the pair of first metal bars 313*a* and 313*b* and the vibration element 311 may be adjusted to 60 mm to 100 mm. For example, the pair of first metal bars 313*a* and 313*b* may be respectively disposed on the left and the right of the vibration element 311 with respect to the first direction X. The pair of first metal bars 313*a* and 313*b* may be the same as the pair of metal bars configuring the display apparatus illustrated in FIGS. 1 to 12, and thus, their detailed descriptions are not repeated.

The pair of second metal bars 313*c* and 313*d* may be disposed on the rear surface 100*a* of the display panel 100 in parallel in a second direction Y with the vibration element 311 therebetween with respect to the second direction Y. In this case, a second distance D2 between each of the pair of second metal bars 313*c* and 313*d* and the vibration element 311 may be adjusted to 60 mm to 100 mm and may be equal to or different from the first distance D1 within a range of 60 mm to 100 mm. For example, the pair of second metal bars 313*c* and 313*d* may be respectively disposed on and under the vibration element 311 with respect to the first direction X. The pair of second metal bars 313*c* and 313*d* may be the same as the pair of metal bars configuring the display apparatus illustrated in FIG. 13, and thus, their detailed descriptions are not repeated.

The vibration reflecting member 313 may have a weight (or a mass) based on the pair of first metal bars 313*a* and 313*b* and the pair of second metal bars 313*c* and 313*d*, and thus, an inertia moment of the display panel 100 based on a vibration of the vibration element 311 may increase. Therefore, when the display panel 100 vibrates based on the vibration of the vibration element 311, a resonant frequency "$f_0$" of the display panel 100 may be further reduced according to a weight as expressed in Equation (1), thereby improving a frequency characteristic of a low-pitched sound band of a sound generated based on the vibration of the display panel 100.

The display apparatus according to the present embodiment may have the same effect as that of each of the display apparatus illustrated in FIG. 4 and the display apparatus illustrated in FIG. 12.

In the display apparatus according to the present embodiment, the vibration element 311 may be disposed on the rear surface 100*a* of the display panel 100 with the air gap AG therebetween as illustrated in FIG. 6, and as illustrated in FIG. 8, may include the metal plate MP. Also, as illustrated in FIG. 7, the pair of first metal bars 313*a* and 313*b* and the pair of second metal bars 313*c* and 313*d* may be attached on the rear surface 100*a* of the display panel 100 by the first connection member 314 and may be attached on the front surface 500*a* of the rear mechanical structure 500 by the second connection member 315. Also, as illustrated in FIG. 9, each metal bar in the pair of first metal bars 313*a* and 313*b* and the pair of second metal bars 313*c* and 313*d* may include the extension part EP. Also, as illustrated in FIG. 11, each metal bar in the pair of first metal bars 313*a* and 313*b* and the pair of second metal bars 313*c* and 313*d* may have a concavely curved shape with respect to the vibration element 311.

Figure 14:
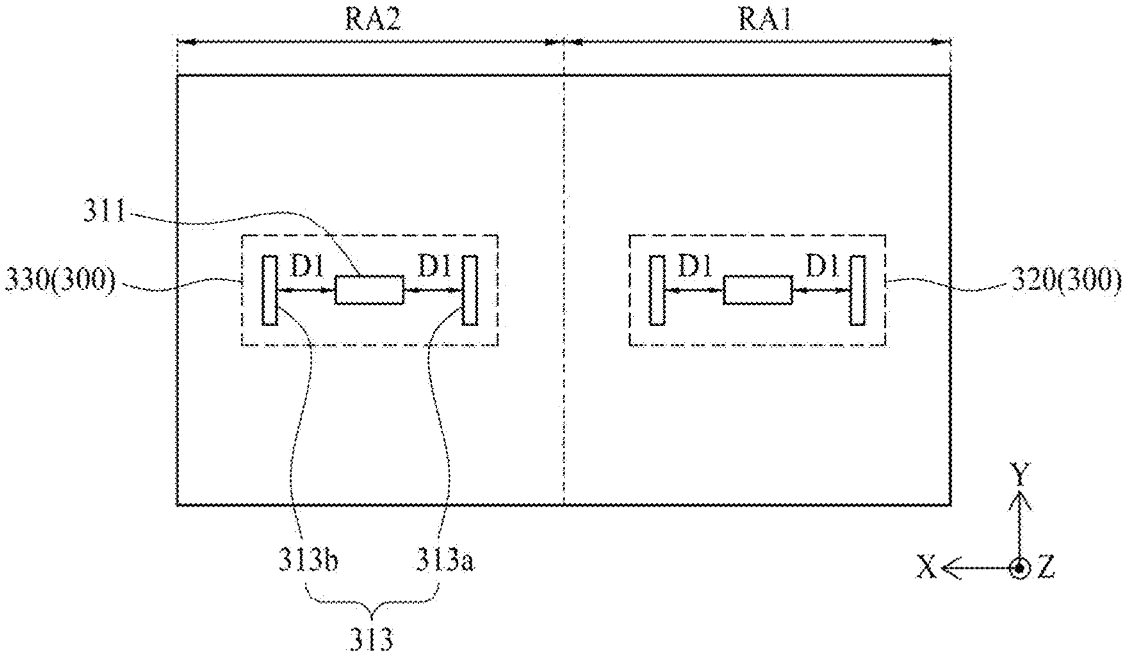
FIG. 14 is a diagram illustrating a sound generation device according to a second embodiment of the present disclosure.

FIG. 14 is a diagram illustrating a sound generation device 300 according to a second embodiment of the present disclosure and illustrates an example which is implemented by modifying a configuration of a sound generation device in the display apparatus illustrated in FIG. 4. Hereinafter, therefore, only a sound generation device will be described, and descriptions of the other elements are omitted.

With reference to FIG. 14, the sound generation device 300 according to the second embodiment of the present disclosure may include at least one first vibration generation module 320 and at least one second vibration generation module 330, which vibrate according to a sound signal (or a vibration driving signal) provided from a sound driving circuit to vibrate a display panel 100.

First, the display panel 100 may include a first rear region RA1 and a second rear region RA2. For example, with respect to a rear center of the display panel 100, the first rear region RA1 may be a right region, and the second rear region RA2 may be a left region.

The at least one first vibration generation module 320 according to an embodiment may be disposed in the first rear region RA1 of the display panel 100 and may vibrate the first rear region RA1 of the display panel 100. The at least one first vibration generation module 320 may have the same configuration as that of the vibration generation module 310 included in one of the display apparatuses illustrated in FIGS. 2 to 12, and thus, its detailed description is not repeated.

The at least one second vibration generation module 330 according to an embodiment may be disposed in the second rear region RA2 of the display panel 100 and may vibrate the second rear region RA2 of the display panel 100. The at least one second vibration generation module 330 may have the same configuration as that of the vibration generation module 310 included in one of the display apparatuses illustrated in FIGS. 2 to 12, and thus, its detailed description is not repeated.

A display apparatus including the sound generation device 300 according to the second embodiment of the present disclosure may output a sound according to a vibration of each of the first and second rear regions RA1 and RA2 of the display panel 100 caused by the at least one first and second vibration generation devices 320 and 330, and thus, a surround sound having an enhanced sound pressure characteristic and frequency characteristic of a low-pitched sound band as well as a high-pitched sound band may be provided to viewers.

Figure 15:
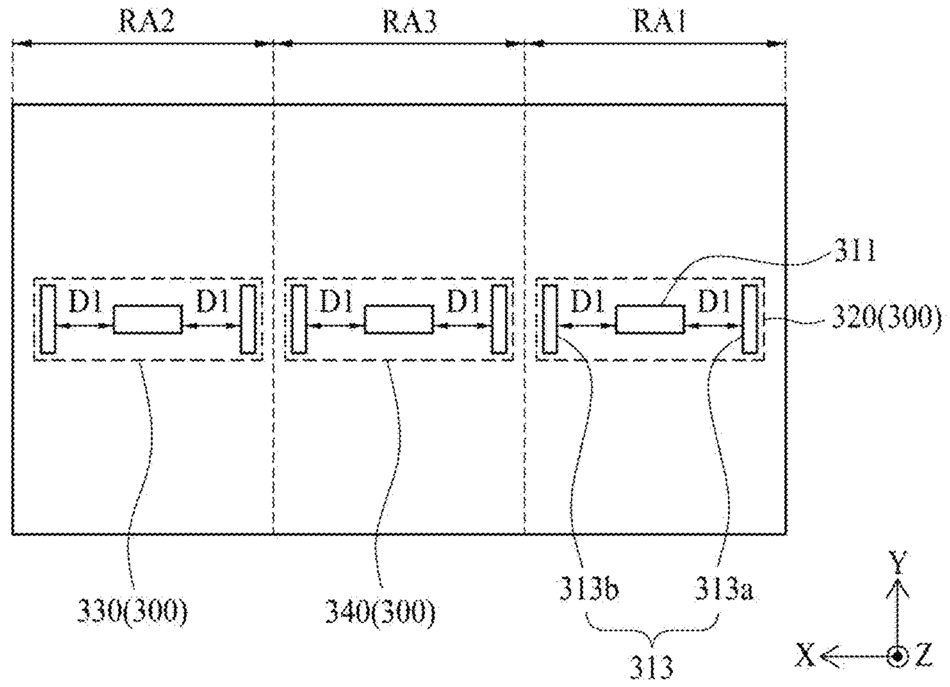
FIG. 15 is a diagram illustrating a sound generation device according to a third embodiment of the present disclosure.

FIG. 15 is a diagram illustrating a sound generation device 300 according to a third embodiment of the present disclosure and illustrates an example which is implemented by modifying a configuration of a sound generation device in the display apparatus illustrated in FIG. 4. Hereinafter, therefore, only a sound generation device will be described, and descriptions of the other elements are omitted.

With reference to FIG. 15, the sound generation device 300 according to the third embodiment of the present disclosure may include at least one first vibration generation module 320, at least one second vibration generation module 330, and at least one third vibration generation module 340, which vibrate according to a sound signal (or a vibration driving signal) provided from a sound driving circuit to vibrate a display panel 100.

First, the display panel 100 may include a first rear region RA1, a second rear region RA2, and a third rear region RA3. For example, with respect to a rear center of the display panel 100, the first rear region RA1 may be a right region, the second rear region RA2 may be a left region, and the third rear region RA3 may be a middle region, including the rear center, between the left region and the right region.

The at least one first vibration generation module 320 according to an embodiment may be disposed in the first rear region RA1 of the display panel 100 and may vibrate the first rear region RA1 of the display panel 100. The at least one first vibration generation module 320 may have the same configuration as that of the vibration generation module 310 included in one of the display apparatuses illustrated in FIGS. 2 to 12, and thus, its detailed description is not repeated. For example, the at least one first vibration generation module 320 may vibrate the first rear region RA1 of the display panel 100 to output a sound having a middle-high sound-pitched band. Here, the sound having the middle-high-pitched sound band may have a frequency of 1 kHz or more, but is not limited thereto.

The at least one second vibration generation module 330 according to an embodiment may be disposed in the second rear region RA2 of the display panel 100 and may vibrate the second rear region RA2 of the display panel 100. The at least one second vibration generation module 330 may have the same configuration as that of the vibration generation module 310 included in one of the display apparatuses illustrated in FIGS. 2 to 12, and thus, its detailed description is not repeated. For example, the at least one second vibration generation module 330 may vibrate the second rear region RA2 of the display panel 100 to output a sound having a middle-high-pitched sound band.

The at least one third vibration generation module 340 according to an embodiment may be disposed in the third rear region RA3 of the display panel 100 and may vibrate the third rear region RA3 of the display panel 100. The at least one third vibration generation module 340 may have the same configuration as that of the vibration generation module 310 included in one of the display apparatuses illustrated in FIGS. 2 to 12, and thus, its detailed description is not repeated. For example, the at least one third vibration generation module 340 may vibrate the third rear region RA3 of the display panel 100 to output a sound having a low-pitched sound band.

In the present embodiment, if a separation distance between the first and third vibration generation modules 320 and 340 is adjusted to 60 mm to 100 mm, one of two metal bars 313*a* and 313*b* disposed between a vibration element 311 of the first vibration generation module 320 and a vibration element 311 of the third vibration generation module 340 may be omitted, and the other may be disposed in a middle region between the vibration element 311 of the first vibration generation module 320 and the vibration element 311 of the third vibration generation module 340 and may be shared by the first vibration generation module 320 and the third vibration generation module 340. Likewise, if a separation distance between the second and third vibration generation modules 330 and 340 is adjusted to 60 mm to 100 mm, one of two metal bars 313*a* and 313*b* disposed between a vibration element 311 of the second vibration generation module 330 and the vibration element 311 of the third vibration generation module 340 may be omitted, and the other may be disposed in a middle region between the vibration element 311 of the second vibration generation module 330 and the vibration element 311 of the third vibration generation module 340 and may be shared by the second vibration generation module 330 and the third vibration generation module 340.

A display apparatus including the sound generation device 300 according to the third embodiment of the present disclosure may output a sound according to vibrations of the first to third second rear regions RA1 to RA3 of the display panel 100 respectively caused by the first to third vibration generation devices 320, 330, and 340, and thus, a surround sound having a more enhanced sound pressure characteristic and frequency characteristic of a low-pitched sound band and an enhanced sound pressure characteristic and frequency characteristic of a middle-high-pitched sound band may be provided to viewers.

Figure 16:
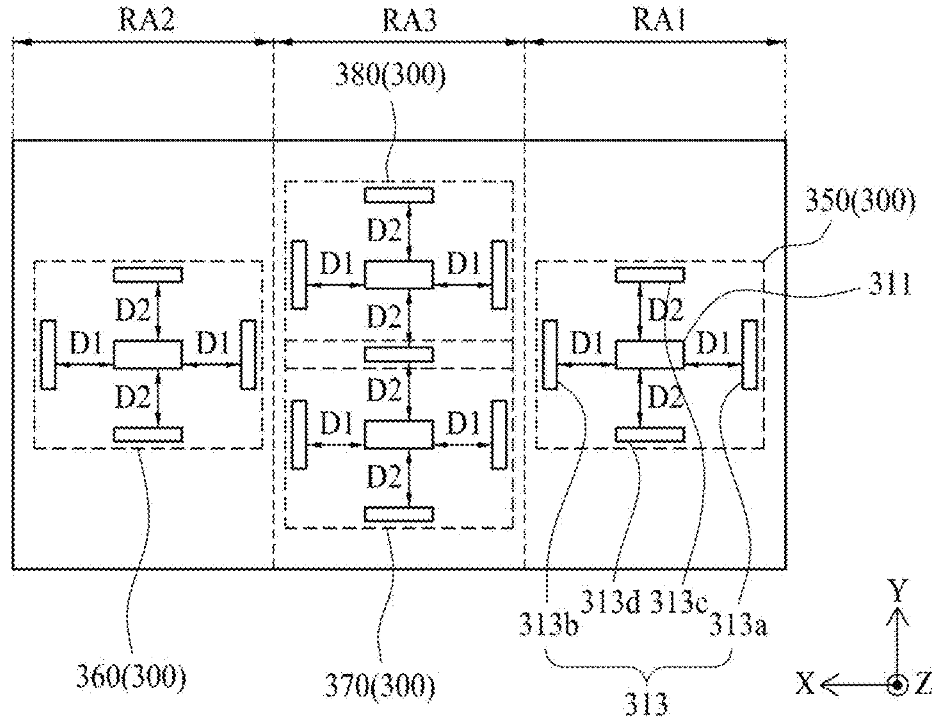
FIG. 16 is a diagram illustrating a sound generation device according to a fourth embodiment of the present disclosure.

FIG. 16 is a diagram illustrating a sound generation device 300 according to a fourth embodiment of the present disclosure and illustrates an example which is implemented by modifying a configuration of a sound generation device in the display apparatus illustrated in FIG. 4. Hereinafter, therefore, only a sound generation device will be described, and descriptions of the other elements are omitted.

With reference to FIG. 16, the sound generation device 300 according to the fourth embodiment of the present disclosure may include at least one first vibration generation module 350, at least one second vibration generation module 360, and a plurality of third vibration generation module 370 and 380, which vibrate according to a sound signal (or a vibration driving signal) provided from a sound driving circuit to vibrate a display panel 100.

First, the display panel 100 may include a first rear region RA1, a second rear region RA2, and a third rear region RA3. For example, with respect to a rear center of the display panel 100, the first rear region RA1 may be a right region, the second rear region RA2 may be a left region, and the third rear region RA3 may be a middle region, including the rear center, between the left region and the right region.

The at least one first vibration generation module 350 according to an embodiment may be disposed in the first rear region RA1 of the display panel 100 and may vibrate the first rear region RA1 of the display panel 100. The at least one first vibration generation module 350 may have the same configuration as that of the vibration generation module 310 included in the display apparatus illustrated in FIG. 13, and thus, its detailed description is not repeated. For example, the at least one first vibration generation module 350 may vibrate the first rear region RA1 of the display panel 100 to output a sound having a middle-high-pitched sound band.

The at least one second vibration generation module 360 according to an embodiment may be disposed in the second rear region RA2 of the display panel 100 and may vibrate the second rear region RA2 of the display panel 100. The at least one second vibration generation module 360 may have the same configuration as that of the vibration generation module 310 included in the display apparatus illustrated in FIG. 13, and thus, its detailed description is not repeated. For example, the at least one second vibration generation module 360 may vibrate the second rear region RA2 of the display panel 100 to output a sound having a middle-high-pitched sound band.

Each of the plurality of third vibration generation modules 370 and 380 according to an embodiment may be disposed in the third rear region RA3 of the display panel 100 along a second direction Y and may vibrate the third rear region RA3 of the display panel 100. For example, if two third vibration generation modules 370 and 380 are disposed in the third rear region RA3 of the display panel 100, the two third vibration generation modules 370 and 380 may be spaced apart from a center of the display panel 100 by the same distance. Each of the plurality of third vibration generation modules 370 and 380 may have the same configuration as that of the vibration generation module 310 included in the display apparatus illustrated in FIG. 13, and thus, its detailed description is not repeated. For example, each of the plurality of third vibration generation modules 370 and 380 may vibrate the third rear region RA3 of the display panel 100 to output a sound having a low-pitched sound band.

If a separation distance between the plurality of third vibration generation modules 370 and 380 is adjusted to 60 mm to 100 mm, one of two metal bars 313*c* and 313*d* disposed between the plurality of third vibration generation modules 370 and 380 may be omitted, and the other may be disposed in a middle region between the plurality of third vibration generation modules 370 and 380 and may be shared by the plurality of third vibration generation modules 370 and 380.

A display apparatus including the sound generation device 300 according to the fourth embodiment of the present disclosure may output a sound according to vibrations of the first to third rear regions RA1 to RA3 of the display panel 100 respectively caused by the first to third vibration generation devices 350, 360, 370, and 380, and thus, a surround sound having a more enhanced sound pressure characteristic and frequency characteristic of a low-pitched sound band and an enhanced sound pressure characteristic and frequency characteristic of a middle-high-pitched sound band may be provided to viewers.

Figure 17:
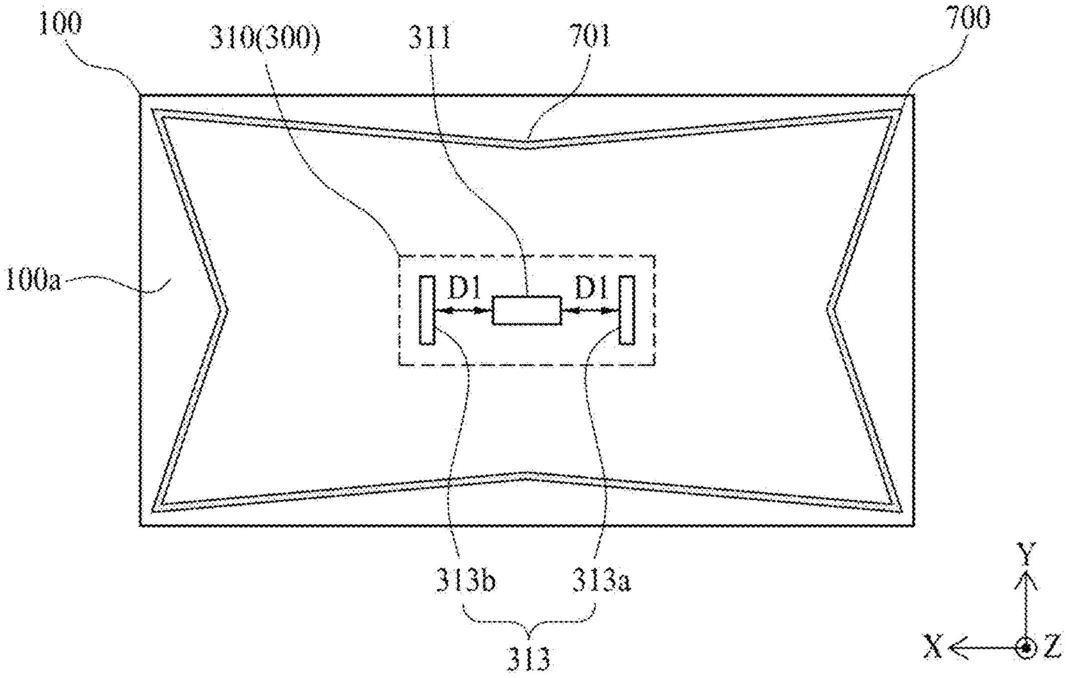
FIG. 17 is a diagram illustrating a partition member in a display apparatus according to a second embodiment of the present disclosure.

FIG. 17 is a diagram illustrating a partition member in a display apparatus according to a second embodiment of the present disclosure and illustrates an example where a partition member is added to the display apparatus illustrated in FIGS. 1 to 11. Hereinafter, therefore, only a partition member and elements relevant thereto will be described, and descriptions of the other elements are omitted.

With reference to FIG. 17, the display apparatus according to the second embodiment of the present disclosure may further include a partition member 700 which is disposed between a rear surface 100*a* of a display panel 100 and a rear mechanical structure and surrounds a sound generation device 300.

The partition member 700 may be disposed between a rear periphery of the display panel 100 and the rear mechanical structure to surround a vibration generation module 310 included in the sound generation device 300. The partition member 700 according to an embodiment may include first to fourth sides. For example, the partition member 700 may have a closed loop shape.

The partition member 700 according to an embodiment may be configured with a single-sided tape or a double-sided tape, which includes polyurethane or polyolefin and has a certain thickness (or height) and width, but is not limited thereto. And, the partition member 700 according to an embodiment may have an elasticity which enables compression to be formed to some extent, and may be referred to as a foam pad.

The partition member 700 may be disposed between the rear periphery of the display panel 100 and the rear mechanical structure to surround the vibration generation module 310, and thus, may prevent a sound pressure, generated based on a vibration of the display panel 100 caused by a vibration of the vibration generation module 310, from being leaked in a direction toward each of side surfaces of the display panel 100, thereby enhancing a front output characteristic of a sound pressure.

At least one of the first to fourth sides according to an embodiment may include a bent part 701.

The bent part 701 may be bent from at least one of the first to fourth sides to the vibration element 311 or the vibration reflecting member 313. The bent part 701 may be bent to have a certain inclined angle with respect to a corresponding side. The bent part 701 according to an embodiment may be bent from each of the first to fourth sides of the partition member 700 to the vibration element 311 or the vibration reflecting member 313. For example, a side, including the bent part 701, of the partition member 700 may have a planar V-shape, or may have a zigzag shape without being limited thereto.

An inclined angle of the bent part 701 according to an embodiment may vary based on a desired degree to which a standing wave is suppressed, and may be adjusted to 10 degrees to 30 degrees. For example, in a case where a sound having a low-pitched sound band is generated in a sound generation region or an output of a vibration generation module is relatively large, the inclined angle of the bent part 701 may be adjusted to a large angle. On the other hand, in a case where a sound having a high-pitched sound band is generated in the sound generation region or the output of the vibration generation module is relatively small, the inclined angle of the bent part 701 may be adjusted to a small angle.

The bent part 701 decreases a degree to which a sound pressure is reduced between the display panel 100 and the rear mechanical structure. For example, a sound wave generated by the display panel 100 vibrated by the vibration generation module 310 may be spread radially from a center of the vibration generation module 310 and may travel. The sound wave may be referred to as a progressive wave, and a sound wave which is generated through reflection of the progressive wave by the partition member 700 and travels may be referred to as a reflected wave. The reflected wave may overlap the progressive wave or may be counteracted by the progressive wave, and thus, may not travel, whereby the reflected wave may stand in a certain position to generate a standing wave. A sound pressure is reduced by the standing wave, and for this reason, a sound output characteristic is reduced. Therefore, the bent part 701 may be provided at a position at which a level of each of the progressive wave and the reflected wave is high, thereby decreasing the degree of reduction in sound pressure caused by the standing wave generated by interference between the reflected wave and the progressive wave. Particularly, because the standing wave is much generated at a position at which a level of each of the progressive wave and the reflected wave is high, the bent part 701 may be bent from the partition member 701 to a center of the vibration generation module 310 where a level of a sound wave transferred from the vibration generation module 310 is largest.

The display apparatus according to the present embodiment has the same effect as that of the display apparatus illustrated in FIGS. 1 to 11, and the partition member 700 prevents a sound, generated based on a vibration of the display panel 100, from being leaked in a direction toward each of side surfaces of the display panel 100, thereby enhancing a front output characteristic of a sound.

Figure 18:
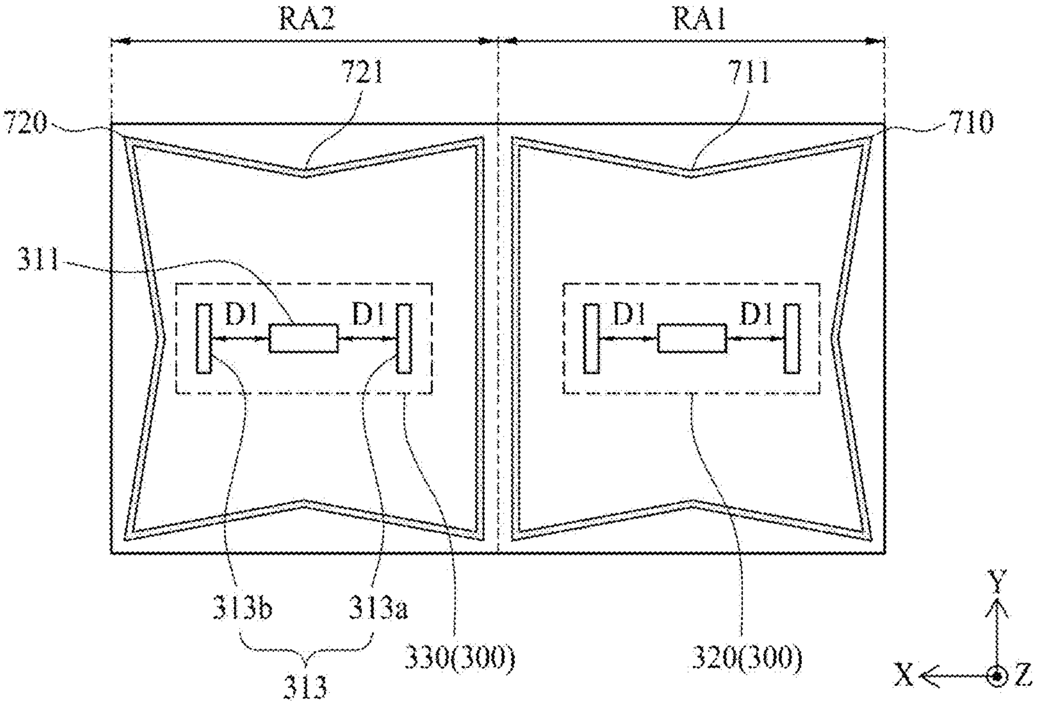
FIG. 18 is a diagram illustrating a partition member in a display apparatus according to a third embodiment of the present disclosure.

FIG. 18 is a diagram illustrating a partition member in a display apparatus according to a third embodiment of the present disclosure and illustrates an example where a partition member is added to the display apparatus illustrated in FIG. 14. Hereinafter, therefore, only a partition member and elements relevant thereto will be described, and descriptions of the other elements are omitted.

With reference to FIG. 18, the display apparatus according to the third embodiment of the present disclosure may further include first and second partition members 710 are 720 which are disposed between a rear surface 100*a* of a display panel 100 and a rear mechanical structure and respectively surround at least one first and second vibration generation modules 320 and 330 included in a sound generation device 300.

The first partition member 710 may be disposed between a periphery of a first rear region RA1 of the display panel 100 and the rear mechanical structure to surround the at least one first vibration generation module 320 of the sound generation device 300. The first partition member 710 according to an embodiment may include first to fourth sides. For example, the first partition member 710 may have a closed loop shape.

The second partition member 720 may be disposed between a periphery of a second rear region RA2 of the display panel 100 and the rear mechanical structure to surround the at least one second vibration generation module 320 of the sound generation device 300. The second partition member 720 according to an embodiment may include first to fourth sides. For example, the second partition member 720 may have a closed loop shape. In other words, the partition members 710, 720 may be arranged on the rear surface 100*a* of the display panel 100 and the rear mechanical structure 500, wherein each partition member 710, 720 surrounds one of the rear regions RA1, RA2. The partition members 710, 720 may be spaced apart from each other.

Each of the first and second partition members 710 and 720 according to an embodiment may be configured with a single-sided tape or a double-sided tape, which includes polyurethane or polyolefin and has a certain thickness (or height) and width, but is not limited thereto.

Because the first partition member 710 is disposed between the periphery of the first rear region RA1 of the display panel 100 and the rear mechanical structure to surround the at least one first vibration generation module 320 and the second partition member 720 is disposed between the periphery of the second rear region RA2 of the display panel 100 and the rear mechanical structure to surround the at least one second vibration generation module 320, the first and second partition members 710 and 720 prevent a sound pressure, generated based on a vibration of the display panel 100, from being leaked in a direction toward each of side surfaces of the display panel 100, thereby enhancing a front output characteristic of a sound pressure. And, sounds generated in the first and second rear regions RA1 and RA2 of the display panel 100 may be separated from each other, thereby enhancing a sound output characteristic.

At least one of the first to fourth sides included in each of the first and second partition members 710 and 720 according to an embodiment may include a plurality of bent parts 711 and 721.

The bent part 711 may be bent from at least one of the first to fourth sides of the first partition member 710 to a vibration element 311 or a vibration reflecting member 313, and the bent part 721 may be bent from at least one of the first to fourth sides of the second partition member 720 to the vibration element 311 or the vibration reflecting member 313. The bent part 711 according to an embodiment may be bent from the second and third sides, except the first side adjacent to a center of the display panel 100 among the first to fourth sides of the first partition member 710, to the vibration element 311 or the vibration reflecting member 313, and the bent part 721 according to an embodiment may be bent from the second and third sides, except the first side adjacent to the center of the display panel 100 among the first to fourth sides of the second partition member 720, to the vibration element 311 or the vibration reflecting member 313. For example, a side including the bent part 711 (721) of the first (second) partition member 710 (720) may have a planar V-shape, or may have a zigzag shape without being limited thereto. The bent parts 711 and 721, as illustrated in FIG. 17, may be provided at a position at which a level of each of the progressive wave and the reflected wave is high, thereby decreasing the degree of reduction in sound pressure caused by the standing wave generated by interference between the reflected wave and the progressive wave.

The display apparatus according to the present embodiment may have the same effect as that of the display apparatus illustrated in FIG. 14, and the first and second partition members 710 and 720 prevent a sound, generated based on a vibration of the display panel 100, from being leaked in a direction toward each of side surfaces of the display panel 100, thereby enhancing a front output characteristic of a sound. Also, sounds generated in the first and second rear regions RA1 and RA2 of the display panel 100 may be separated from each other, thereby improving a sound output characteristic.

Figure 19:
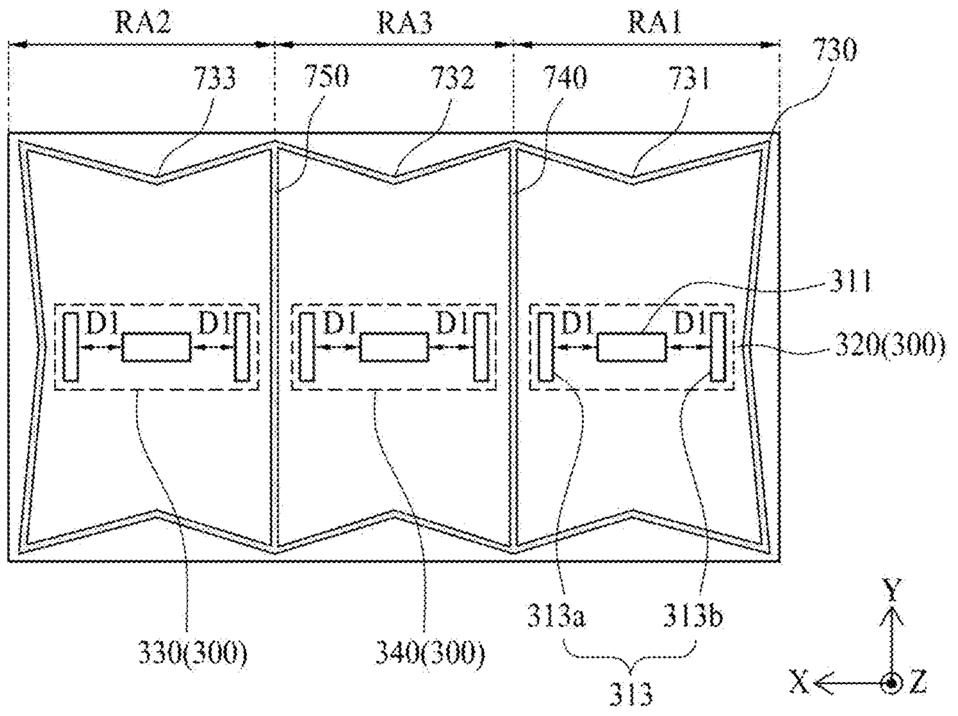
FIG. 19 is a diagram illustrating a partition member in a display apparatus according to a fourth embodiment of the present disclosure.

FIG. 19 is a diagram illustrating a partition member in a display apparatus according to a fourth embodiment of the present disclosure and illustrates an example where a partition member is added to the display apparatus illustrated in FIG. 15. Hereinafter, therefore, only a partition member and elements relevant thereto will be described, and descriptions of the other elements are omitted.

With reference to FIG. 19, the display apparatus according to the fourth embodiment of the present disclosure may further include a first partition member 730, a second partition member 740, and a third partition member 750, which are disposed between a rear surface 100*a* of a display panel 100 and a rear mechanical structure and surround at least one first to third vibration generation modules 320, 330, and 340 included in a sound generation device 300.

The first partition member 730 may be disposed between a periphery of a rear surface of the display panel 100 and the rear mechanical structure to surround the first to third vibration generation modules 320, 330, and 340 of the sound generation device 300. The first partition member 730 according to an embodiment may include first to fourth sides. For example, the first partition member 730 may have a closed loop shape.

The second partition member 740 may be disposed between a first rear region RA1 and a third rear region RA3 of the display panel 100, and between the display panel 100 and the rear mechanical structure. The second partition member 740 according to an embodiment may have a rectilinear shape parallel to a second direction Y.

The third partition member 750 may be disposed between a second rear region RA2 and the third rear region RA3 of the display panel 100, and between the display panel 100 and the rear mechanical structure. The third partition member 750 according to an embodiment may have a rectilinear shape parallel to the second direction Y. For example, the third partition member 750 may be disposed in parallel with the second partition member 740 with the third vibration generation module 340 therebetween. In other words, the partition member 730 surrounds all of the rear regions RA1, RA2, RA3, and each the other partition members 740, 750 separates adjacent rear regions from each other. That is, the partition member 740 separates the rear regions RA3 and RA1 from one another, and the partition member 750 separates the rear regions RA2 and RA3 from one another.

Each of the first to third partition members 730, 740, and 750 according to an embodiment may be configured with a single-sided tape or a double-sided tape, which includes polyurethane or polyolefin and has a certain thickness (or height) and width, but is not limited thereto.

The first partition member 730 may be disposed between the periphery of the rear surface of the display panel 100 and the rear mechanical structure to surround all of the first to third vibration generation modules 320, 330, and 340, and thus, may prevent a sound pressure, generated based on a vibration of the display panel 100 caused by a vibration of each of the first to third vibration generation modules 320, 330, and 340, from being leaked in a direction toward each of side surfaces of the display panel 100, thereby enhancing a front output characteristic of a sound pressure. And, each of the second and third partition members 740 and 750 may separate sounds which are generated in the first to third rear regions RA1 to RA3 of the display panel 100, thereby enhancing a sound output characteristic.

At least one of the first to fourth sides of the first partition member 730 according to an embodiment may include a plurality of bent parts 731, 732, and 733.

The bent parts 731, 732, and 733 may be bent from at least one of the first to fourth sides of the first partition member 730 to a vibration element 311 or a vibration reflecting member 313. Each of the bent parts 731, 732, and 733 may be bent to have a certain inclined angle with respect to a corresponding side. The bent parts 731, 732, and 733 may be bent from each of the first to fourth sides of the first partition member 730 to the vibration element 311 or the vibration reflecting member 313, in the first to third rear regions RA1 to RA3 of the display panel 100. For example, each of the second and fourth sides of the first partition member 730 disposed in the first to third rear regions RA1 to RA3 of the display panel 100 may be disposed in a planar W-shape including three bent parts 731, 732, and 733 which are bent to the vibration element 311 or the vibration reflecting member 313 in each of the first to third rear regions RA1 to RA3 of the display panel 100, or may have a zigzag shape without being limited thereto. Also, each of the first and third sides of the first partition member 730 may be disposed in a planar V-shape including one bent part bent to the vibration reflecting member 313, or may have a zigzag shape without being limited thereto. The bent parts 731, 732, and 733, as illustrated in FIG. 17, may be provided at a position at which a level of each of the progressive wave and the reflected wave is high, thereby decreasing the degree of reduction in sound pressure caused by the standing wave generated by interference between the reflected wave and the progressive wave.

The display apparatus according to the present embodiment may have the same effect as that of the display apparatus illustrated in FIG. 15, and the first to third partition members 730, 740, and 750 prevent a sound, generated based on a vibration of the display panel 100, from being leaked in a direction toward each of side surfaces of the display panel 100, thereby enhancing a front output characteristic of a sound. And, sounds generated in the first to third rear regions RA1 to RA3 of the display panel 100 may be separated from each other, thereby improving a sound output characteristic.

Figure 20:
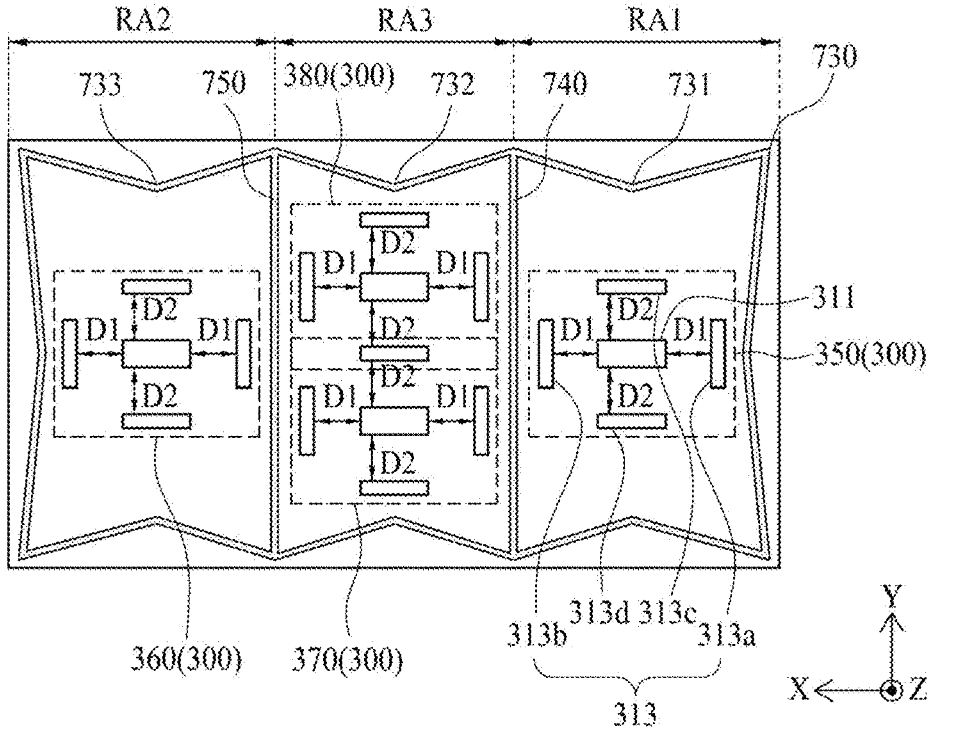
FIG. 20 is a diagram illustrating a partition member in a display apparatus according to a fifth embodiment of the present disclosure.

FIG. 20 is a diagram illustrating a partition member in a display apparatus according to a fifth embodiment of the present disclosure and illustrates an example where a partition member is added to the display apparatus illustrated in FIG. 16. Hereinafter, therefore, only a partition member and elements relevant thereto will be described, and descriptions of the other elements are omitted.

With reference to FIG. 20, the display apparatus according to the fifth embodiment of the present disclosure may further include a first partition member 730, a second partition member 740, and a third partition member 750, which are disposed between a rear surface 100*a* of a display panel 100 and a rear mechanical structure and surround at least one first to third vibration generation modules 350, 360, and 370 included in a sound generation device 300.

The first to third partition members 730, 740, and 750 are the same as the partition members illustrated in FIG. 19, and thus, their detailed descriptions are not repeated.

At least one of first to fourth sides of the first partition member 730 according to an embodiment may include a plurality of bent parts 731, 732, and 733. The bent parts 731, 732, and 733 may be the same as the bent parts illustrated in FIG. 19, and thus, their detailed descriptions are not repeated.

The display apparatus according to the present embodiment may have the same effect as that of the display apparatus illustrated in FIG. 16, and the first to third partition members 730, 740, and 750 may prevent a sound, generated based on a vibration of the display panel 100, from being leaked in a direction toward each of side surfaces of the display panel 100, thereby enhancing a front output characteristic of a sound. And, sounds generated in first to third rear regions RA1 to RA3 of the display panel 100 may be separated from each other, thereby improving a sound output characteristic.

Figure 21:
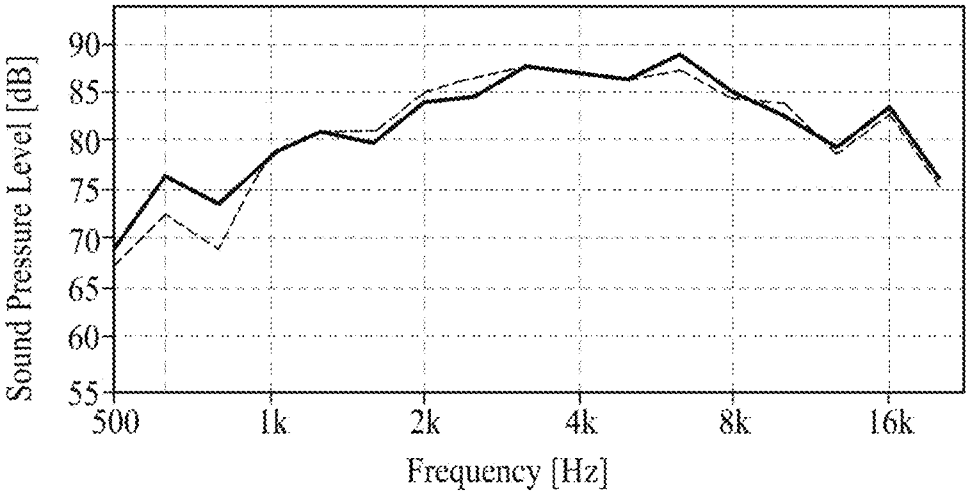
FIG. 21 is a graph showing a sound output characteristic of a display apparatus according to an embodiment of the present disclosure and a sound output characteristic of a display apparatus according to a comparative example.

FIG. 21 is a graph showing a sound output characteristic of a display apparatus according to an embodiment of the present disclosure and a sound output characteristic of a display apparatus according to a comparative example. In FIG. 21, a thick solid line A represents a sound output characteristic of the display apparatus according to an embodiment of the present disclosure illustrated in FIG. 13, a dotted line B represents a sound output characteristic of the display apparatus according to the comparative example, and the comparative example has used a voice coil type actuator as a sound output device of the display apparatus according to an embodiment of the present disclosure illustrated in FIG. 13. In FIG. 21, the abscissa axis represents a frequency in hertz (Hz), and the ordinate axis represents a sound pressure level in decibels (dB). Here, the sound output characteristic has been measured by a sound analysis apparatus.

As seen in FIG. 21, it can be confirmed that in a low-pitched sound band frequency of 1 kHz or less, the display apparatus according to an embodiment of the present disclosure has a sound pressure characteristic which is relatively better than the display apparatus according to the comparative example. Therefore, according to example embodiments of the present disclosure, a sound pressure level and a frequency characteristic of a low-pitched sound band of a sound output based on a vibration of a display panel may be improved even in a case where a piezoelectric element where a sound output characteristic of a high-pitched sound band is relatively good is used as a vibration element without using the voice coil type actuator where a sound output characteristic of a low-pitched sound band is relatively good. Particularly, according to example embodiments of the present disclosure, because the display panel vibrates by using a piezoelectric element as a vibration element, a sound having an enhanced sound pressure characteristic and frequency characteristic of a low-pitched sound band as well as a middle-high-pitched sound band may be provided to a viewer, thereby increasing the viewer's immersion experience.

The display apparatus according to the example embodiments of the present disclosure may be applied to mobile devices, video phones, smart watches, watch phones, wearable devices, foldable devices, rollable devices, bendable devices, flexible devices, curved devices, portable multimedia players (PMPs), personal digital assistants (PDAs), electronic organizers, desktop personal computers (PCs), laptop PCs, netbook computers, workstations, navigation devices, automotive navigation devices, automotive display apparatuses, TVs, wall paper display apparatuses, signage apparatuses, game machines, notebook computers, monitors, cameras, camcorders, home appliances, etc. Also, the display apparatus according to the example embodiments of the present disclosure may be applied to lighting apparatuses and the like.

A display apparatus according to example embodiments of the present disclosure will be described below.

A display apparatus according to an embodiment of the present disclosure comprises a display panel configured to display an image and a sound generation device including at least one vibration generation module vibrating the display panel, wherein the at least one vibration generation module comprises a vibration element on a rear surface of the display panel and a vibration reflecting member on the rear surface of the display panel and spaced apart from the vibration element.

According to an embodiment of the present disclosure, a distance between the vibration reflecting member and the vibration element may be 60 mm to 100 mm.

According to an embodiment of the present disclosure, the vibration reflecting member may include a pair of metal bars in parallel with the vibration element therebetween.

According to an embodiment of the present disclosure, the pair of metal bars may each include an extension part extending toward the vibration element.

According to an embodiment of the present disclosure, the vibration reflecting member may include a pair of first metal bars in parallel with the vibration element therebetween, with respect to a first direction and a pair of second metal bars in parallel with the vibration element therebetween, with respect to a second direction intersecting the first direction.

According to an embodiment of the present disclosure, at least one of the pair of metal bars and the pair of second metal bars may each include an extension part extending toward the vibration element.

According to an embodiment of the present disclosure, the vibration element may include a piezoelectric material layer, and a portion or an entire portion of a front surface of the piezoelectric material layer may be attached on the rear surface of the display panel by an adhesive member.

According to an embodiment of the present disclosure, the vibration element may include a piezoelectric material layer and a metal plate on a front surface of the piezoelectric material, and a portion or an entire portion of the front surface of the piezoelectric material layer may be attached on the rear surface of the display panel by an adhesive member.

According to an embodiment of the present disclosure, each of the pair of metal bars may have a concavely curved shape.

According to an embodiment of the present disclosure, the display apparatus may further include a rear mechanical structure on the rear surface of the display panel, wherein the vibration reflecting member may contact the rear mechanical structure, or may be spaced apart from the rear mechanical structure.

According to an embodiment of the present disclosure, the display apparatus may further include at least one partition member between the rear surface of the display panel and the rear mechanical structure to surround the at least one vibration generation module.

According to an embodiment of the present disclosure, the at least one partition member may include first to fourth sides, and at least one of the first to fourth sides may include a bent part bent toward the vibration element or the vibration reflecting member.

According to an embodiment of the present disclosure, the display panel may include a first rear region and a second rear region, and the sound generation device may include a first vibration generation module in the first rear region of the display panel and includes the vibration element and the vibration reflecting member, and a second vibration generation module in the second rear region of the display panel and includes the vibration element and the vibration reflecting member.

According to an embodiment of the present disclosure, the display apparatus may further include a first partition member and a second partition member between the rear surface of the display panel and the rear mechanical structure to surround each of the first vibration generation module and the second vibration generation module.

According to an embodiment of the present disclosure, the first partition member and the second partition member may each include first to fourth sides, and at least one of the first to fourth sides may include a bent part bent toward the vibration element facing the at least one side or the vibration reflecting member facing the at least one side.

According to an embodiment of the present disclosure, the display panel may include a first rear region, a second rear region, and a third rear region between the first rear region and the second rear region. The sound generation device may include at least one first vibration generation module in the first rear region of the display panel and includes the vibration element and the vibration reflecting member, at least one second vibration generation module in the second rear region of the display panel and includes the vibration element and the vibration reflecting member, and at least one third vibration generation module in the third rear region of the display panel and includes the vibration element and the vibration reflecting member.

According to an embodiment of the present disclosure, the display apparatus may further include a first partition member between the rear surface of the display panel and the rear mechanical structure to surround all of the first to third vibration generation modules, a second partition member between the first rear region and the third rear region, and a third partition member between the second rear region and the third rear region.

According to an embodiment of the present disclosure, the first partition member may include first to fourth sides, and at least one of the first to fourth sides may include a bent part bent toward the vibration element or the vibration reflecting member in the first to third rear regions of the display panel.

A display apparatus according to an embodiment of the present disclosure comprises a display panel configured to display an image and a sound generation device including at least one vibration generation module configured to vibrate the display panel, wherein the at least one vibration generation module may include a vibration element on a rear surface of the display panel and a weight member on the rear surface of the display panel.

According to an embodiment of the present disclosure, a distance between the weight member and the vibration element may be 60 mm to 100 mm.

According to an embodiment of the present disclosure, the weight member may include a pair of metal bars in parallel with the vibration element therebetween, with respect to at least one direction of a first direction and a second direction intersecting the first direction.

According to an embodiment of the present disclosure, a weight of each of the pair of metal bars may be 10% to 90% of a total weight of the display panel.

According to an embodiment of the present disclosure, the pair of metal bars may each include an extension part extending toward the vibration element.

As described above, according to the embodiments of the present disclosure, a sound generated based on a vibration of the display panel may be output to a region in front of the display panel, thereby increasing a viewer's immersion experience.

And, according to the embodiments of the present disclosure, a frequency characteristic of a low-pitched sound band and a sound pressure characteristic of a sound generated based on a vibration of the display panel are improved.

And, according to the embodiments of the present disclosure, a sound having an enhanced sound pressure characteristic and frequency characteristic of a low-pitched sound band as well as a high-pitched sound band may be provided to viewers.

It will be apparent to those skilled in the art that various modifications and variations maybe made in the present disclosure without departing from the technical idea or scope of the disclosures. Thus, it may be intended that embodiments of the present disclosure cover the modifications and variations of the disclosure provided they come within the scope of the appended claims and their equivalents.

What is claimed is:

1. An apparatus for outputting sound, comprising:
a vibration plate;
a vibration element at a rear surface of the vibration plate; and
a vibration reflecting member spaced apart from the vibration element to face a lateral surface of the vibration element,
wherein the vibration reflecting member includes a concave part that has a concavely curved shape facing the vibration element, and
wherein the vibration reflecting member includes a metal material.

2. The apparatus of claim 1, wherein:
the vibration reflecting member includes:
a pair of first sides parallel to a long-side direction of the vibration element; and
a pair of second sides parallel to a short-side direction of the vibration element;
the pair of first sides have a first length;
the pair of second sides have a second length; and
the first length is shorter than the second length.

3. The apparatus of claim 1, wherein:
the vibration reflecting member includes a pair of metal bars; and
the pair of metal bars are in parallel with the vibration element therebetween with respect to a first direction.

4. The apparatus of claim 3, wherein the pair of metal bars have the concave part.

5. The apparatus of claim 1, wherein:
the vibration reflecting member includes:
a pair of first sides parallel to a long-side direction of the vibration element; and
a pair of second sides parallel to a short-side direction of the vibration element;
the pair of first sides have a third length;
the pair of second sides have a fourth length; and
the third length is larger than the fourth length.

6. The apparatus of claim 1, wherein:
the vibration reflecting member includes:
a pair of first metal bars; and
a pair of second metal bars;
the pair of first metal bars are in parallel with the vibration element therebetween with respect to a first direction; and the pair of second metal bars are in parallel with the vibration element therebetween with respect to a second direction intersecting the first direction.

7. The apparatus of claim 6, wherein at least one of the pair of first metal bars and the pair of second metal bars comprises an extension part extending toward the vibration element.

8. The apparatus of claim 6, wherein at least one of the pair of first metal bars and the pair of second metal bars has the concave part.

9. The apparatus of claim 1, wherein the vibration element includes:
a piezoelectric material layer;
a metal plate on the piezoelectric material layer;
a first electrode between the metal plate and the piezoelectric material layer; and
a second electrode on a rear surface of the piezoelectric material layer.

10. The apparatus of claim 9, wherein the vibration element further includes an adhesive layer on each of one periphery and another periphery of the metal plate.

11. The apparatus of claim 1, wherein the vibration element includes:
a piezoelectric material layer; and
an adhesive layer on each of one periphery and another periphery of the piezoelectric material layer.

12. The apparatus of claim 1, further comprising a partition member surrounding the vibration element and the vibration reflecting member.

13. The apparatus of claim 1, further comprising:
a partition member surrounding the vibration element and the vibration reflecting member,
wherein the partition member includes first to fourth sides, and
wherein at least one of the first to fourth sides includes a bent part bent toward the vibration element or toward the vibration reflecting member.

14. The apparatus of claim 1, wherein the vibration plate is a panel speaker configured to vibrate by the vibration element to output a sound.

15. The apparatus of claim 1, wherein:
the vibration plate is a display panel; and
the display panel is configured to display an image and be used as a panel speaker which vibrates by the vibration element to output a sound.

16. An apparatus, comprising:
a panel speaker including a first rear region and a second rear region;
a sound generation device configured to vibrate one or more of the first rear region and the second rear region to output a sound; and
a vibration reflecting member spaced apart from the sound generation device to face a lateral surface of the sound generation device,
wherein the vibration reflecting member includes a concave part that has a concavely curved shape facing the sound generation device, and
wherein the vibration reflecting member includes a metal material.

17. The apparatus of claim 16, further comprising a partition member surrounding the sound generation device and the vibration reflecting member.

18. The apparatus of claim 16, wherein:
the sound generation device includes:
a first vibration element configured to vibrate the first rear region; and
a second vibration element configured to vibrate the second rear region;
the vibration reflecting member includes:
a first vibration reflecting member spaced apart from the first vibration element; and
a second vibration reflecting member spaced apart from the second vibration element; and
the first vibration reflecting member and the second vibration reflecting member include a metal material.

19. The apparatus of claim 18, wherein:
each of the first vibration reflecting member and the second vibration reflecting member includes:
a pair of first sides parallel to a long-side direction of the first and second vibration elements; and
a pair of second sides parallel to a short-side direction of the first and second vibration elements;
the pair of first sides have a first length;
the pair of second sides have a second length; and
the first length is shorter than the second length.

20. The apparatus of claim 18, wherein:
each of the first vibration reflecting member and the second vibration reflecting member includes:
a pair of first sides parallel to a long-side direction of the first or second vibration element; and
a pair of second sides parallel to a short-side direction of the first or second vibration element;
the pair of first sides have a third length;
the pair of second sides have a fourth length; and
the third length is larger than the fourth length.

21. The apparatus of claim 18, wherein:
the first vibration reflecting member includes a pair of first metal bars;
the pair of first metal bars are in parallel with the first vibration element therebetween with respect to a first direction;
the second vibration reflecting member includes a pair of second metal bars; and
the pair of second metal bars are in parallel with the second vibration element therebetween with respect to the first direction.

22. The apparatus of claim 18, wherein:
the first vibration reflecting member includes:
a pair of first metal bars; and
a pair of second metal bars;
the pair of first metal bars are in parallel with the first vibration element therebetween with respect to a first direction; and
the pair of second metal bars are in parallel with the first vibration element therebetween with respect to a second direction intersecting the first direction.

23. The apparatus of claim 22, wherein at least one of the pair of first metal bars and the pair of second metal bars comprises an extension part extending toward the vibration element.

24. The apparatus of claim 22, wherein at least one of the pair of first metal bars and the pair of second metal bars has the concave part.

25. The apparatus of claim 18, wherein:
the second vibration reflecting member includes:
a pair of first metal bars; and
a pair of second metal bars;
the pair of first metal bars are in parallel with the second vibration element therebetween with respect to a first direction; and
the pair of second metal bars are in parallel with the second vibration element therebetween with respect to a second direction intersecting the first direction.

26. The apparatus of claim 25, wherein at least one of the pair of first metal bars and the pair of second metal bars comprises an extension part extending toward the vibration element.

27. The apparatus of claim 25, wherein at least one of the pair of first metal bars and the pair of second metal bars has the concave part.

28. The apparatus of claim 18, further comprising a partition member surrounding the first vibration element and the first vibration reflecting member, wherein the partition member includes first to fourth sides, and wherein at least one of the first to fourth sides includes a bent part bent toward the first vibration element or toward the first vibration reflecting member.

29. The apparatus of claim 18, further comprising a partition member surrounding the second vibration element and the second vibration reflecting member, wherein the partition member includes first to fourth sides, and wherein at least one of the first to fourth sides includes a bent part bent toward the second vibration element or toward the second vibration reflecting member.

30. The apparatus of claim 18, wherein each of the first vibration element and the second vibration element includes:

a piezoelectric material layer;

a metal plate on the piezoelectric material layer;

a first electrode between the metal plate and the piezoelectric material layer; and a second electrode on a rear surface of the piezoelectric material layer.

31. The apparatus of claim 30, wherein each of the first vibration element and the second vibration element further includes an adhesive layer on each of one periphery and another periphery of the metal plate.

32. The apparatus of claim 18, wherein each of the first vibration element and the second vibration element includes:

a piezoelectric material layer; and an adhesive layer on each of one periphery and another periphery of the piezoelectric material layer.

33. The apparatus of claim 18, wherein:

the panel speaker further includes a third rear region between the first rear region and the second rear region;

the sound generation device further includes a third vibration element configured to vibrate the third rear region; and the vibration reflecting member further includes a third vibration reflecting member spaced apart from the third vibration element.

34. The apparatus of claim 33, wherein the third vibration reflecting member includes a metal material.

35. The apparatus of claim 33, wherein:

the third vibration reflecting member includes a pair of first metal bars; and the pair of first metal bars are in parallel with the third vibration element therebetween with respect to a first direction.

36. The apparatus of claim 33, wherein:

the third vibration reflecting member includes:

a pair of first metal bars; and a pair of second metal bars;

the pair of first metal bars are in parallel with the third vibration element therebetween with respect to a first direction; and the pair of second metal bars are in parallel with the third vibration element therebetween with respect to a second direction intersecting the first direction.

37. The apparatus of claim 33, wherein:

the sound generation device further includes another third vibration element configured to vibrate the third rear region; and the vibration reflecting member further includes another third vibration reflecting member spaced apart from the other third vibration element.

38. The apparatus of claim 37, wherein:

the other third vibration reflecting member includes a pair of other first metal bars; and the pair of other first metal bars are in parallel with the other third vibration element.

39. The apparatus of claim 37, wherein:

the other third vibration reflecting member includes:

a pair of other first metal bars; and another second metal bar;

the pair of other first metal bars are in parallel with the third vibration element;

the other second metal bar is perpendicular to the third vibration element and the other third vibration element; and a middle region of the third vibration element and the other third vibration element shares the other second metal bar.

40. The apparatus of claim 16, wherein:

the panel speaker is a display panel; and the display panel is configured to display an image and to be vibrated by the sound generation device to output a sound.

* * * * *